United States Patent
Hsieh et al.

(10) Patent No.: US 8,145,375 B2
(45) Date of Patent: Mar. 27, 2012

(54) SYSTEM CONSTRAINTS METHOD OF DETERMINING MINIMUM AND MAXIMUM TORQUE LIMITS FOR AN ELECTRO-MECHANICAL POWERTRAIN SYSTEM

(75) Inventors: Tung-Ming Hsieh, Carmel, IN (US); Anthony H. Heap, Ann Arbor, MI (US)

(73) Assignees: GM Global Technology Operations LLC, Detroit, MI (US); Daimler AG, Stuttgart (DE); Chrysler LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 761 days.

(21) Appl. No.: 12/238,559

(22) Filed: Sep. 26, 2008

(65) Prior Publication Data

US 2009/0118924 A1  May 7, 2009

Related U.S. Application Data

(60) Provisional application No. 60/984,524, filed on Nov. 1, 2007.

(51) Int. Cl.
 *G06F 19/00* (2006.01)
 *B60W 10/10* (2006.01)
(52) U.S. Cl. .............. 701/22; 475/5; 477/15; 180/1; 180/65.225; 180/65.25; 180/65.285; 180/65.29
(58) Field of Classification Search .............. 477/57, 477/3, 7, 15; 701/53, 112, 54, 22, 51; 903/902; 475/5; 180/1, 65.225, 65.26, 65.25, 65.285, 180/65.29
See application file for complete search history.

(56) References Cited

U.S. PATENT DOCUMENTS

| | | |
|---|---|---|
| 6,832,148 B1 | 12/2004 | Bennett |
| 6,868,318 B1 | 3/2005 | Cawthorne |
| 7,154,236 B1 | 12/2006 | Heap |
| 2005/0076958 A1 | 4/2005 | Foster |
| 2005/0077867 A1 | 4/2005 | Cawthorne |
| 2005/0077877 A1 | 4/2005 | Cawthorne |
| 2005/0080523 A1 | 4/2005 | Bennett |
| 2005/0080527 A1 | 4/2005 | Tao |
| 2005/0080535 A1 | 4/2005 | Steinmetz |
| 2005/0080537 A1 | 4/2005 | Cawthorne |
| 2005/0080538 A1 | 4/2005 | Hubbard |
| 2005/0080539 A1 | 4/2005 | Hubbard |
| 2005/0080540 A1 | 4/2005 | Steinmetz |
| 2005/0080541 A1 | 4/2005 | Sah |
| 2005/0182526 A1 | 8/2005 | Hubbard |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |

(Continued)

*Primary Examiner* — Ronnie Mancho

(57) ABSTRACT

A powertrain including an electro-mechanical transmission mechanically-operatively coupled to an internal combustion engine and first and second electric machines to transmit power to an output member is disclosed. A method for controlling the electro-mechanical transmission includes determining minimum and maximum motor torque constraints for the first and second electric machines, and determining available battery power in terms of battery power constraints. One of a first, a second and a third case is determined based upon the motor torque constraints and the battery power constraints. A preferred output torque is determined for transmitting to the output member of the electro-mechanical transmission.

27 Claims, 18 Drawing Sheets

U.S. PATENT DOCUMENTS

| | | |
|---|---|---|
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Zettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1* | 3/2009 | Heap ................ 477/5 |
| 2009/0069989 A1 | 3/2009 | Heap |
| 2009/0070019 A1* | 3/2009 | Heap ............ 701/112 |
| 2009/0082170 A1* | 3/2009 | Heap ................ 477/3 |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1* | 4/2009 | Cawthorne et al. ............. 701/54 |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |

| | | |
|---|---|---|
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118950 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |

* cited by examiner

US 8,145,375 B2

SYSTEM CONSTRAINTS METHOD OF DETERMINING MINIMUM AND MAXIMUM TORQUE LIMITS FOR AN ELECTRO-MECHANICAL POWERTRAIN SYSTEM

CROSS REFERENCE TO RELATED APPLICATIONS

This application claims the benefit of U.S. Provisional Application No. 60/984,524 filed on Nov. 1, 2007 which is hereby incorporated herein by reference.

TECHNICAL FIELD

This disclosure pertains to control systems for electro-mechanical transmissions.

BACKGROUND

The statements in this section merely provide background information related to the present disclosure and may not constitute prior art.

Known hybrid powertrain architectures can include multiple torque-generative devices, including internal combustion engines and non-combustion machines, e.g., electric machines, which transmit torque through a transmission device to an output member. One exemplary hybrid powertrain includes a two-mode, compound-split, electro-mechanical transmission which utilizes an input member for receiving tractive torque from a prime mover power source, preferably an internal combustion engine, and an output member. The output member can be operatively connected to a driveline for a motor vehicle for transmitting tractive torque thereto. Machines, operative as motors or generators, can generate torque inputs to the transmission independently of a torque input from the internal combustion engine. The machines may transform vehicle kinetic energy transmitted through the vehicle driveline to energy that is storable in an energy storage device. A control system monitors various inputs from the vehicle and the operator and provides operational control of the hybrid powertrain, including controlling transmission operating state and gear shifting, controlling the torque-generative devices, and regulating the power interchange among the energy storage device and the machines to manage outputs of the transmission, including torque and rotational speed.

SUMMARY

A powertrain including an electro-mechanical transmission mechanically-operatively coupled to an internal combustion engine and an electric machine adapted to transmit power to an output member is disclosed. A method for controlling the electro-mechanical transmission includes determining minimum and maximum motor torque constraints for the first and second electric machines, and determining available battery power in terms of battery power constraints. One of a first, a second and a third case is determined based upon the minimum and maximum motor torque constraints for the first and second electric machines relative to the battery power constraints, and a predetermined zone of the determined one of the first, second and third case is selected. At least one output torque for the selected zone based upon the motor torque constraints and the battery power constraints is determined, and a preferred output torque is selected for the selected zone for transmitting to the output member of the electro-mechanical transmission.

BRIEF DESCRIPTION OF THE DRAWINGS

One or more embodiments will now be described, by way of example, with reference to the accompanying drawings, in which.

DETAILED DESCRIPTION

Figure 1:
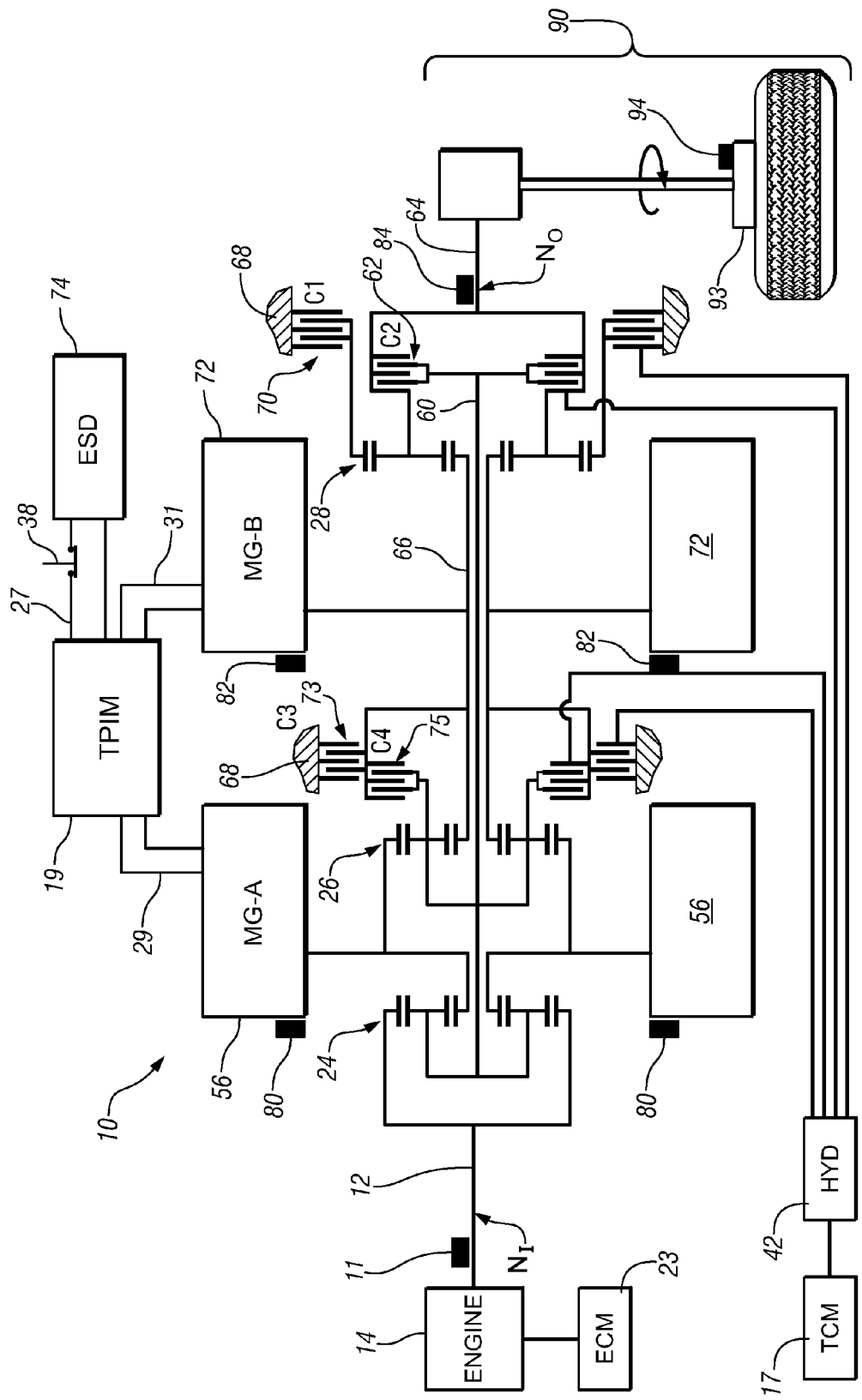
FIG. 1 is a schematic diagram of an exemplary powertrain, in accordance with the present disclosure.
Figure 2:
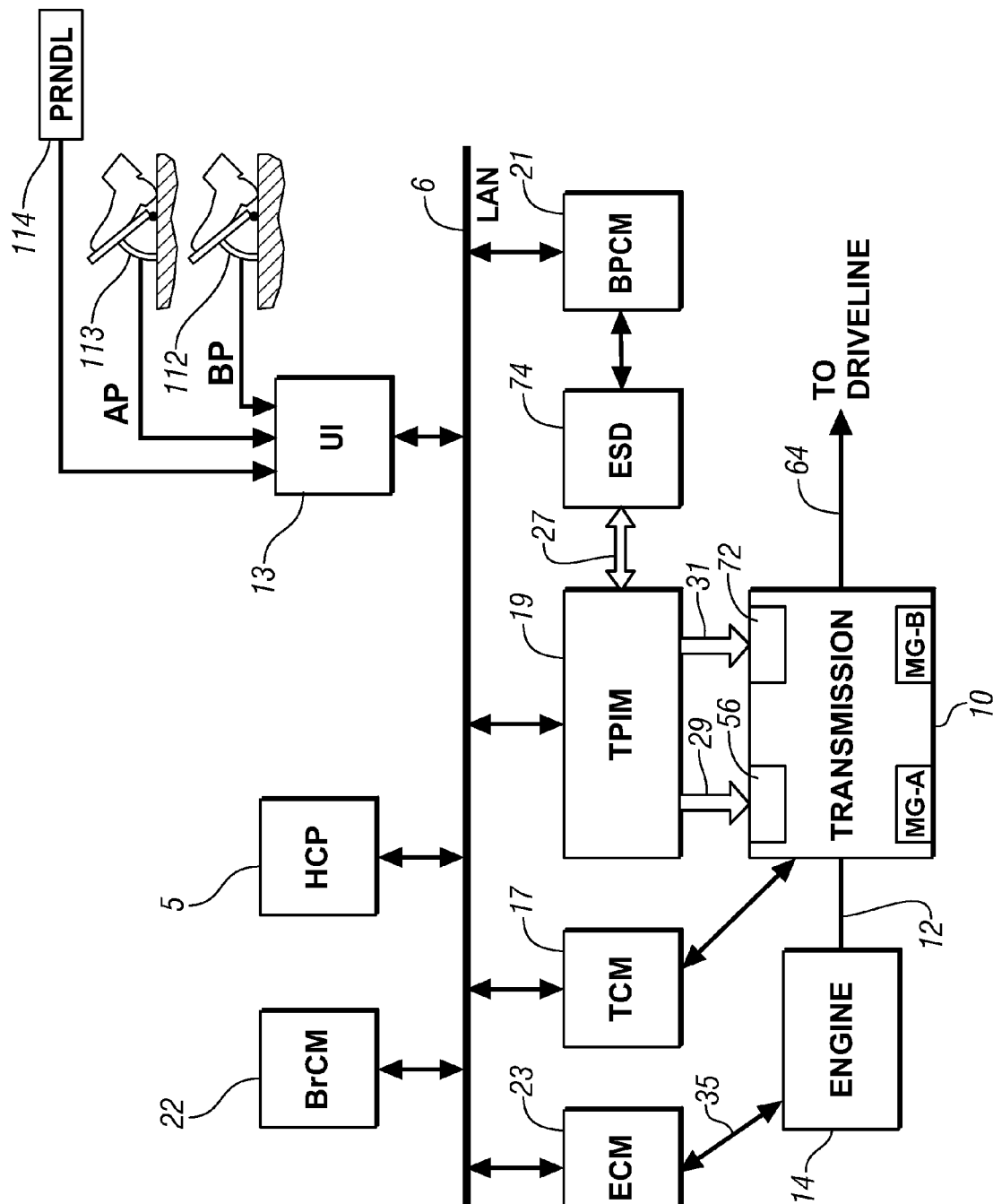
FIG. 2 is a schematic diagram of an exemplary architecture for a control system and powertrain, in accordance with the present disclosure; and, FIGS. 3-19 are graphical diagrams, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electero-mechanical hybrid powertrain in accordance with the present disclosure is depicted in FIG. 1, comprising a two-mode, compound-split, electro-mechanical hybrid transmission 10 operatively connected to an engine 14 and first and second electric machines ('MG-A') 56 and ('MG-B') 72. The engine 14 and first and second electric machines 56 and 72 each generate power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and engine torque, can differ from the input speed $N_I$ and the input torque $T_I$ to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is signally connected to a plurality of devices through which a vehicle operator controls or directs operation of the electro-mechanical hybrid powertrain. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torques $T_A$ and $T_B$ for the first and second electric machines 56 and 72. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and serial peripheral interface buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several operating range states that can be described in terms of an engine state comprising one of an engine-on state ('ON') and an engine-off state ('OFF'), and a transmission state comprising a plurality of fixed gears and continuously variable operating modes, described with reference to Table 1, below.

TABLE 1

| Description | Engine State | Transmission Operating Range State | Applied Clutches | |
| --- | --- | --- | --- | --- |
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2 _Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque generative devices comprising the engine 14 and first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, a commanded output torque between the transmission 10 and the driveline 90, an input torque from the engine 14, clutch torques for the torque-transfer clutches C1 70, C2 62, C3 73, C4 75 of the transmission 10; and the motor torques for the first and second electric machines 56 and 72, respectively, as is described hereinbelow. The commanded output torque can be a tractive torque wherein torque flow originates in the engine 14 and the first and second electric machines 56 and 72 and is transferred through the transmission 10 to the driveline 90, and can be a reactive torque wherein torque flow originates in the vehicle wheels 93 of the driveline 90 and is transferred through the transmission 10 to first and second electric machines 56 and 72 and the engine 14.

Final vehicle acceleration can be affected by other factors including, e.g., road load, road grade, and vehicle mass. The operating range state is determined for the transmission 10 based upon a variety of operating characteristics of the hybrid powertrain. This includes the operator torque request communicated through the accelerator pedal 113 and brake pedal 112 to the user interface 13 as previously described. The operating range state may be predicated on a hybrid powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required in response to the desired output torque at output member 64 to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transfer power therebetween to generate a power flow to the output member 64.

Operation of the engine 14 and transmission 10 is constrained by power, torque and speed limits of the engine 14, the first and second electric machines 56 and 72, the ESD 74 and the clutches C1 70, C2 62, C3 73, and C4 75. The operating constraints on the engine 14 and transmission 10 can be translated to a set of system constraint equations executed as one or more algorithms in one of the control modules, e.g., the HCP 5.

Referring again to FIG. 1, in overall operation, the transmission 10 operates in one of the operating range states through selective actuation of one or two of the torque-transfer clutches. Torque constraints for each of the engine 14 and the first and second electric machines 56 and 72 and speed constraints for each of the engine 14, the first and second electric machines 56 and 72, and the output shaft 64 of the transmission 10 are determined. Battery power constraints for the ESD 74 are determined, and are applied to further limit the motor torque constraints for the first and second electrical machines 56 and 72. The preferred operating region for the powertrain is determined using the system constraint equation, based upon the battery power constraints, the motor torque constraints, and the speed constraints. The preferred operating region comprises a range of permissible operating torques or speeds for the engine 14 and the first and second electric machines 56 and 72.

By deriving and simultaneously solving dynamics equations of the transmission 10, the torque limit, in this embodiment the output torque $T_O$, can be determined using the following linear equations:

$$T_{M1} = T_A \text{ to } T_{M1} * T_A + T_B \text{ to } T_{M1} * T_B + \text{Misc}\_T_{M1} \quad [1]$$

$$T_{M2} = T_A \text{ to } T_{M2} * T_A + T_B \text{ to } T_{M2} * T_B + \text{Misc}\_T_{M2} \quad [2]$$

$$T_{M3} = T_A \text{ to } T_{M3} * T_A + T_B \text{ to } T_{M3} * T_B + \text{Misc}\_T_{M3} \quad [3]$$

wherein, in this embodiment, $T_{M1}$ represents the output torque $T_O$ at output member 64, $T_{M2}$ represents the input torque $T_I$ at input shaft 12, $T_{M3}$ represents the reactive clutch torque(s) for the applied torque-transfer clutches C1 70, C2 62, C3 73, C4 75 of the transmission 10, $T_A$ to $T_{M1}$, $T_A$ to $T_{M2}$, $T_A$ to $T_{M3}$ are contributing factors of $T_A$ to $T_{M1}$, $T_{M2}$, $T_{M3}$, respectively, $T_B$ to $T_{M1}$, $T_B$ to $T_{M2}$, $T_B$ to $T_{M3}$ are contributing factors of $T_B$ to $T_{M1}$, $T_{M2}$, $T_{M3}$, respectively, Misc_$T_{M1}$, Misc_$T_{M2}$, and Misc_$T_{M3}$ are constants which contribute to $T_{M1}$, $T_{M2}$, $T_{M3}$ by $N_{I\_DOT}$, $N_{O\_DOT}$, and $N_{C\_DOT}$ (time-rate changes in the input speed, output speed and clutch slip speed) respectively, and $T_A$ and $T_B$ are the motor torques from the first and second electric machines 56 and 72.

The torque parameters $T_{M1}$, $T_{M2}$, $T_{M3}$ can be any three independent parameters, depending upon the application.

The engine 14 and transmission 10 and the first and second electric machines 56 and 72 have speed constraints, torque constraints, and battery power constraints due to mechanical and system limitations.

The speed constraints can include engine speed constraints of $N_I = 0$ (engine off state), and $N_I$ ranging from 600 rpm (idle) to 6000 rpm for the engine 14. The speed constraints for the first and second electric machines 56 and 72 can be as follows:

$$-10{,}500 \text{ rpm} \leq N_A \leq +10{,}500 \text{ rpm, and}$$

$$-10{,}500 \text{ rpm} \leq N_B \leq +10{,}500 \text{ rpm.}$$

The torque constraints include engine torque constraints including $T_{I\_MIN} < T_I < T_{I\_MAX}$, and motor torque constraints for the first and second electric machines including $T_{A\_MIN} < T_A < T_{A\_MAX}$ and $T_{B\_MIN} < T_B < T_{B\_MAX}$. The motor torque constraints $T_{A\_MAX}$ and $T_{A\_MIN}$ comprise torque limits for the first electric machine 56 when working as a torque-generative motor and an electrical generator, respectively.

The motor torque constraints $T_{B\_MAX}$ and $T_{B\_MIN}$ comprise torque limits for the second electric machine 72 when working as a torque-generative motor and an electrical generator, respectively. The minimum and maximum motor torque constraints $T_{A\_MAX}$, $T_{A\_MIN}$, $T_{B\_MAX}$, $T_{B\_MIN}$ are preferably obtained from data sets stored in tabular format within one of the memory devices of one of the control modules. Such data sets are empirically derived from conventional dynamometer testing of the combined motor and power electronics (e.g., power inverter) at various temperature and voltage conditions.

Battery power constraints comprise the available battery power within the range of $P_{BAT\_MIN}$ to $P_{BAT\_MAX}$, wherein $P_{BAT\_MIN}$ is minimum allowable battery charging power and $P_{BAT\_MAX}$ is the maximum allowable battery discharging power.

Minimum and maximum values for $T_{M1}$ are determined within the speed constraints, the motor torque constraints, and the battery power constraints during ongoing operation, in order to control operation of the engine 14, the first and second electric machines 56 and 72, also referred to hereinafter as Motor A 56 and Motor B 72, and the transmission 10 to meet the operator torque request and the commanded torque.

An operating range, comprising a torque output range is determinable based upon the battery power constraints of the ESD 74. Calculation of battery power usage, $P_{BAT}$ is as follows:

$$P_{BAT} = P_{A,ELEC} + P_{B,ELEC} + P_{DC\_LOAD} \quad [4]$$

wherein $P_{A,ELEC}$ comprises electrical power from Motor A 56, $P_{B,ELEC}$ comprises electrical power from Motor B 72,
$P_{DC\_LOAD}$ comprises known DC load, including accessory loads.

Substituting equations for $P_{A,ELEC}$ and $P_{B,ELEC}$, yields the following:

$$P_{BAT} = (P_{A,MECH} + P_{A,LOSS}) + (P_{B,MECH} + P_{B,LOSS}) + P_{DC\_LOAD} \quad [5]$$

wherein $P_{A,MECH}$ comprises mechanical power from Motor A 56, $P_{A,LOSS}$ comprises power losses from Motor A 56,
$P_{B,MECH}$ comprises mechanical power from Motor B 72, and
$P_{B,LOSS}$ comprises power losses from Motor B 72.

Eq. 5 can be restated as Eq. 6, below, wherein speeds, $N_A$ and $N_B$, and torques, $T_A$ and $T_B$, are substituted for powers $P_A$ and $P_B$. This includes an assumption that motor and inverter losses can be mathematically modeled as a quadratic equation based upon torque as follows:

$$P_{BAT} = (N_A T_A + (a_1(N_A)T_A^2 + a_2(N_A)T_A + a_3(N_A))) + (N_B T_B + (b_1(N_B)T_B^2 + b_2(N_B)T_B + b_3(N_B)))$$
$$+ P_{DC\_LOAD} \quad ([6])$$

wherein $N_A$, $N_B$ comprise speeds of Motors A and B 56 and 72, $T_A$, $T_B$ comprise torques of Motors A and B 56 and 72, and
a1, a2, a3, b1, b2, b3 each comprise quadratic coefficients which are a function of respective motor speeds, $N_A$, $N_B$.

This can be restated as Eq. 7 as follows.

$$P_{BAT} = a_1 * T_A^2 + (N_A + a_2) * T_A + b_1 * T_B^2 + (N_B + b_2) * T_B + a3 + b3 + P_{DC\_LOAD} \quad [7]$$

This reduces to Eq. 8 as follows.

$$P_{BAT} = a_1[T_A^2 + T_A(N_A + a_2)/a_1 + ((N_A + a_2)/(2*a_1))^2] + b_1[T_B^2 + T_B(N_B + b_2)/b_1 + ((N_B + b_2)/(2*b_1))^2] + a3 + b3 + P_{DC\_LOAD} - (N_A + a_2)^2/(4*a_1) - (N_B + b_2)^2/(4*b_1) \quad [8]$$

This reduces to Eq. 9 as follows.

$$P_{BAT} = a_1[T_A + (N_A + a_2)/(2*a_1)]^2 + b_1[T_B + (N_B + b_2)/(2*b_1)]^2 + a_3 + b_3 + P_{DC\_LOAD} - (N_A + a_2)^2/(4*a_1) - (N_B + b_2)^2/(4*b_1) \quad [9]$$

This reduces to Eq. 10 as follows.

$$P_{BAT} = [SQRT(a_1) * T_A + (N_A + a_2)/(2*SQRT(A_1))]^2 + [SQRT(b_1) * T_B + (N_B + b_2)/(2*SQRT(b_1))]2 + a_3 + b_3 + P_{DC\_LOAD} - (N_A + a_2)^2/(4*a_1) - (N_B + b_2)^2/(4*b_1) \quad [10]$$

This reduces to Eq. 11 as follows.

$$P_{BAT} = (A_1 * T_A + A_2)^2 + (B_1 * T_B + B_2)^2 + C \quad [11]$$

wherein $A_1 = SQRT(a_1)$,
$B_1 = SQRT(b_1)$,
$A_2 = (N_A + a_2)/(2*SQRT(a_1))$,
$B_2 = (N_B + b_2)/(2*SQRT(b_1))$, and
$C = a_3 + b_3 + P_{DC\_LOAD} - (N_A + a_2)^2/(4*a_1) - (N_B + b_2)^2/(4*b_1)$.

The motor torques $T_A$ and $T_B$ can be transformed to $T_X$ and $T_Y$ as follows:

$$\begin{bmatrix} T_X \\ T_Y \end{bmatrix} = \begin{bmatrix} A_1 & 0 \\ 0 & B_1 \end{bmatrix} * \begin{bmatrix} T_A \\ T_B \end{bmatrix} + \begin{bmatrix} A_2 \\ B_2 \end{bmatrix} \quad [12]$$

wherein $T_X$ is the transformation of $T_A$,
$T_Y$ is the transformation of $T_B$, and
$A_1$, $A_2$, $B_1$, $B_2$ comprise application-specific scalar values.
Eq. 11 can thus be further reduced as follows.

$$P_{BAT} = (T_X^2 + T_Y^2) + C \quad [13]$$

$$P_{BAT} = R^2 + C \quad [14]$$

Eq. 12 specifies the transformation of motor torque $T_A$ to $T_X$ and the transformation of motor torque $T_B$ to $T_Y$. Thus, a new coordinate system referred to as $T_X/T_Y$ space is defined, and Eq. 13 comprises battery power, $P_{BAT}$, transformed into $T_X/T_Y$ space. Therefore, the battery power range between maximum and minimum battery power $P_{BAT\_MAX}$ and $P_{BAT\_MIN}$ can be calculated and graphed as radii $R_{Max}$ and $R_{Min}$ with a center at locus (0, 0) in the transformed space $T_X/T_Y$, and as shown with reference to FIG. 3, wherein:

$$R_{Min} = SQRT(P_{BAT\_MIN} - C), \text{ and}$$

$$R_{Max} = SQRT(P_{BAT\_MAX} - C)$$

The minimum and maximum battery powers, $P_{BAT\_MIN}$ and $P_{BAT\_MAX}$, are preferably correlated to various conditions, e.g. state of charge, temperature, voltage and usage (amp-hour/hour). The parameter C, above, is defined as the absolute minimum possible battery power at given motor speeds, $N_A$ and $N_B$, ignoring motor torque limits. Physically, when $T_A = 0$ and $T_B = 0$ the output power from the first and second electric machines 56 and 72 is zero. Physically $T_X = 0$ and $T_Y = 0$ corresponds to a maximum charging power condition for the ESD 74. The positive sign ('+') is defined as discharging power from the ESD 74, and the negative sign ('−') is defined as charging power into the ESD 74. $R_{Max}$ defines a maximum battery power, typically a discharging power, and $R_{Min}$ defines a minimum battery power, typically a charging power.

Figure 3:
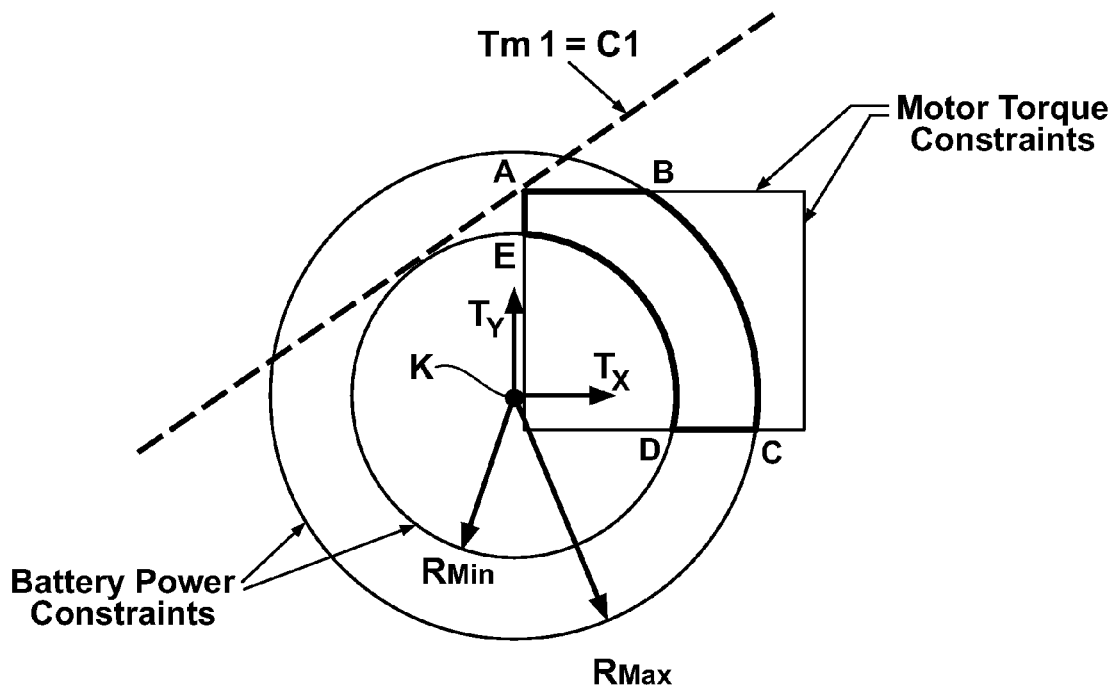

The forgoing transformations to the $T_X/T_Y$ space are shown in FIG. 3, with representations of the battery power constraints as concentric circles having radii of $R_{Min}$ and $R_{Max}$ ('Battery Power Constraints') and linear representations of the motor torque constraints ('Motor Torque Constraints') circumscribing an allowable operating region. Analytically, the transformed vector $[T_X T_Y]$ determined in Eq. 12 is solved simultaneously with the vector defined in Eq. 13 comprising the minimum and maximum battery powers identified by $R_{Min}$ and $R_{Max}$ to identify a range of allowable torques in the $T_X/T_Y$ space which are made up of motor torques $T_A$ and $T_B$ constrained by the minimum and maximum battery powers $P_{BAT\_MIN}$ to $P_{BAT\_MAX}$. The range of allowable torques in the $T_X/T_Y$ space is shown with reference to FIG. 3, wherein points A, B, C, D, and E represent the bounds, and lines and radii are defined.

A constant torque line can be defined in the $T_X/T_Y$ space, and depicted in FIG. 3 ('$T_{M1}$=C1'), comprising the limit torque $T_{M1}$, described in Eq. 1, above. The limit torque $T_{M1}$ comprises the output torque $T_O$ in this embodiment, Eqs. 1, 2, and 3 restated in the $T_X/T_Y$ space are as follows.

$$T_{M1} = T_A \text{ to } T_{M1} * (T_X - A_2)/A_1 + T_B \text{ to } T_{M1} * (T_Y - B_2)/B_1 + \text{Misc}\_T_{M1} \quad [15]$$

$$T_{M2} = T_A \text{ to } T_{M2} * (T_X - A_2)/A_1 + T_B \text{ to } T_{M2} * (T_Y - B_2)/B_1 + \text{Misc}\_T_{M2} \quad [16]$$

$$T_{M3} = T_A \text{ to } T_{M3} * (T_X - A_2)/A_1 + T_B \text{ to } T_{M3} * (T_Y - B_2)/B_1 + \text{Misc}\_T_{M3} \quad [17]$$

Defining $T_{M1\_XY}$, $T_{M2\_XY}$, and $T_{M3\_XY}$ as parts of $T_{M1}$, $T_{M2}$, and $T_{M3}$, contributed by $T_A$ and $T_B$ only, then:

$$T_{M1\_XY} = T_A \text{ to } T_{M1} * (T_X - A_2)/A_1 + T_B \text{ to } T_{M1} * (T_Y - B_2)/B_1 \quad [18]$$

$$T_{M2\_XY} = T_A \text{ to } T_{M2} * (T_X - A_2)/A_1 + T_B \text{ to } T_{M2} * (T_Y - B_2)/B_1 \quad [19]$$

$$T_{M3\_XY} = T_A \text{ to } T_{M3} * (T_X - A_2)/A_1 + T_B \text{ to } T_{M3} * (T_Y - B_2)/B_1 \quad [20]$$

The following coefficients can be defined:

$T_X$ to $T_{M1} = T_A$ to $T_{M1}/A_1$, $T_Y$ to $T_{M1} = T_B$ to $T_{M1}/B_1$, $T_{M1}\_\text{Intercept} = T_A$ to $T_{M1} * A_2/A_1 + T_B$ to $T_{M1} * B_2/B_1$, $T_X$ to $T_{M2} = T_A$ to $T_{M2}/A_1$, $T_Y$ to $T_{M2} = T_B$ to $T_{M2}/B_1$, $T_{M2}\_\text{Intercept} = T_A$ to $T_{M2} * A_2/A_1 + T_B$ to $T_{M2} * B_2/B_1$, $T_X$ to $T_{M3} = T_A$ to $T_{M3}/A_1$, $T_Y$ to $T_{M3} = T_B$ to $T_{M3}/B_1$, and $T_{M3}\_\text{Intercept} = T_A$ to $T_{M3} * A_2/A_1 + T_B$ to $T_{M3} * B_2/B_1$.

Thus, Eqs. 1, 2, and 3 are transformed to $T_X/T_Y$ space as follows.

$$T_{M1\_XY} = T_X \text{ to } T_{M1} * T_X + T_Y \text{ to } T_{M1} * T_Y + T_{M1}\_\text{Intercept} \quad [21]$$

$$T_{M2\_XY} = T_X \text{ to } T_{M2} * T_X + T_Y \text{ to } T_{M2} * T_Y + T_{M2}\_\text{Intercept} \quad [22]$$

$$T_{M3\_XY} = T_X \text{ to } T_{M3} * T_X + T_Y \text{ to } T_{M3} * T_Y + T_{M3}\_\text{Intercept} \quad [23]$$

The speed constraints, motor torque constraints, and battery power constraints can be determined during ongoing operation and expressed in linear equations which are transformed to $T_X/T_Y$ space. Eq. 21 comprises a limit torque function describing the output torque constraint $T_{M1}$, e.g., $T_O$. The limit torque function can be simultaneously solved with the speed constraints, motor torque constraints, and battery power constraints to determine a transformed maximum or minimum limit torque in the $T_X/T_Y$ space, comprising one of $T_{M1\_XY}$Max and $T_{M1\_XY}$Min, i.e., maximum and minimum output torques $T_{O\_Max}$ and $T_{O\_Min}$ that have been transformed. Subsequently the transformed maximum or minimum limit torque in the $T_X/T_Y$ space can be retransformed out of the $T_X/T_Y$ space to determine maximum or minimum limit torques $T_{M1}$_Max and $T_{M1}$_Min for managing control and operation of the transmission 14 and the first and second electric machines 56 and 72.

Figure 4:
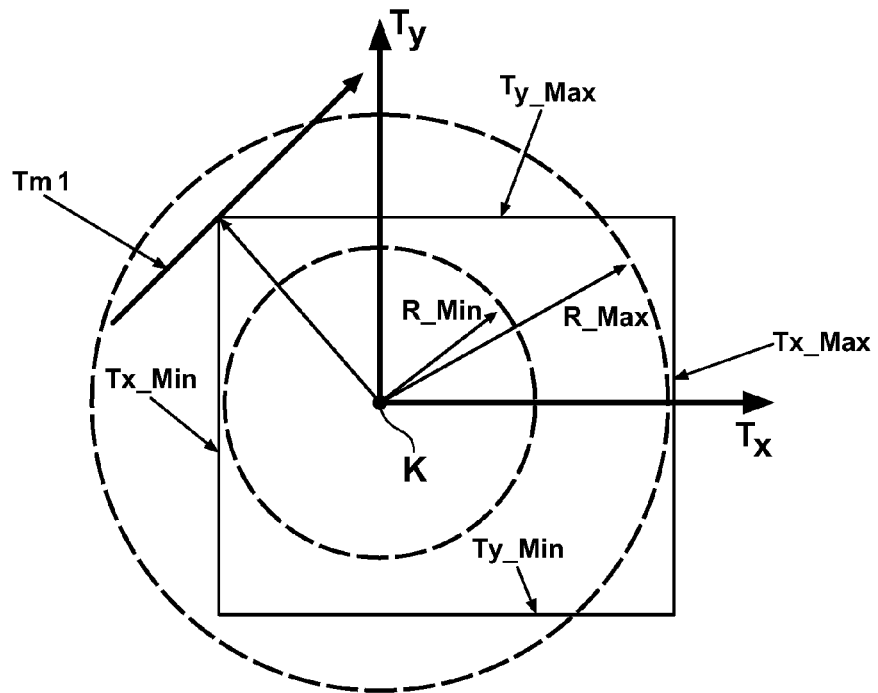
Figure 5:
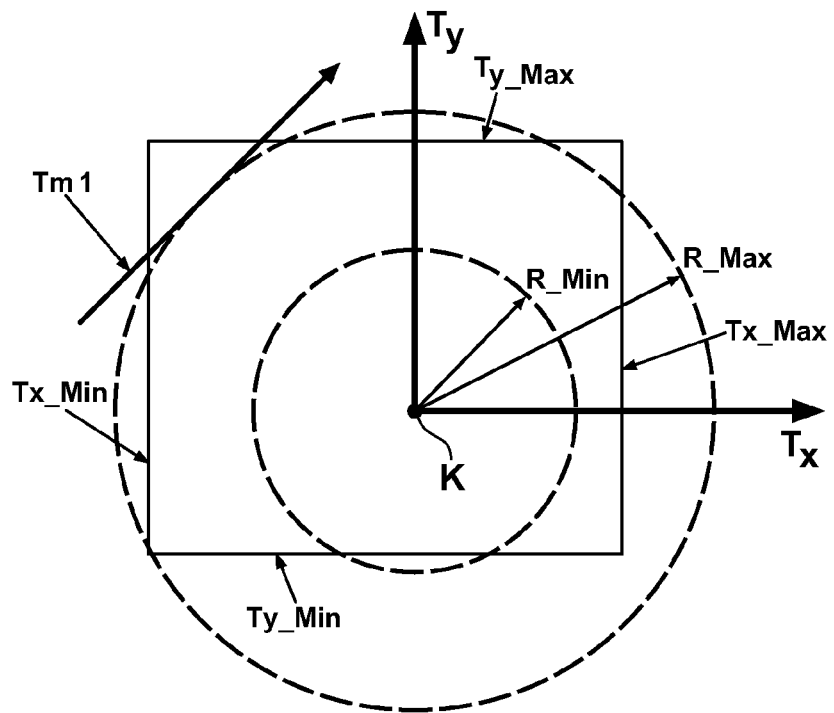
Figure 6:
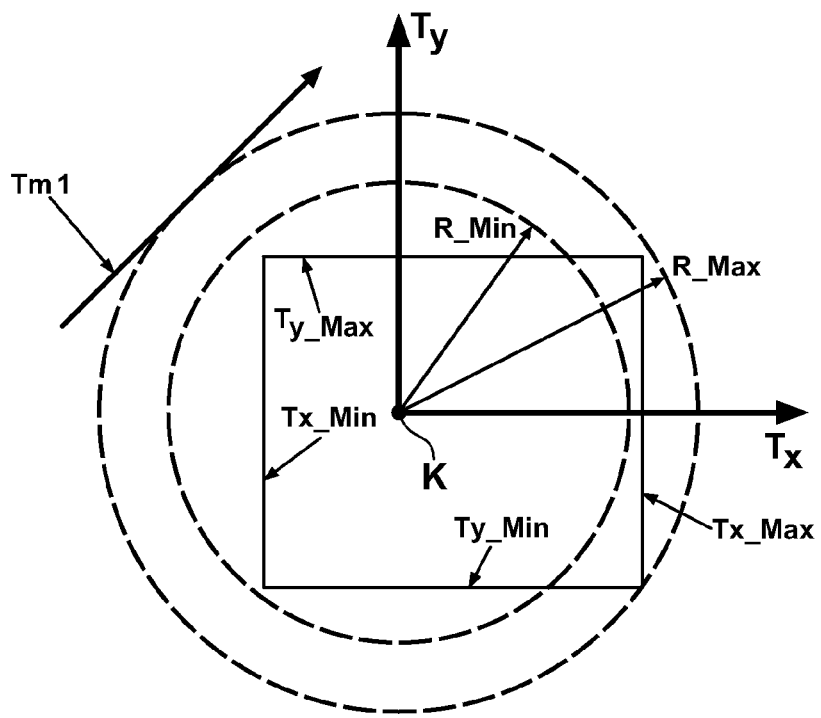

FIGS. 4, 5, and 6 graphically show motor torque constraints consisting of the transformed minimum and maximum motor torques for $T_A$ and $T_B$ transformed to $T_X/T_Y$ space ('Tx_Min', 'Tx_Max', 'Ty_Min', 'Ty_Max'). Battery power constraints are transformed to the $T_X/T_Y$ space ('R_Min', 'R_Max') and have a center locus point K consisting of (Kx, Ky)=(0,0). A constant torque line ('Tm 1') representing line $T_{M1\_XY}$ has a slope of −a/b of the general form:

$$Tm1 = a*Tx + b*Ty + C \quad [24]$$

wherein a<0 and b>0 and C is a constant term. In the ensuing descriptions, the line $T_{M1\_XY}$ has a positive slope of 1:1 for purposes of illustration.

FIG. 4 depicts a first case wherein a combination of the transformed minimum motor torque $T_A$ ('Tx_Min') and the transformed maximum motor torque $T_B$ ('Ty_Max') are within the space defined between the transformed minimum and maximum battery powers $P_{BAT\_MIN}$ to $P_{BAT\_MAX}$ ('R_Min', 'R_Max'). The battery power constraints are sufficient to meet a required battery power for achieving the maximum output torque based upon the motor torque constraints.

FIG. 5 depicts a second case wherein the combination of the transformed minimum motor torque $T_A$ ('Tx_Min') and the transformed maximum motor torque $T_B$ ('Ty_Max') is greater than the transformed maximum battery power ('R_Max'). The battery power constraints are less than sufficient to meet a required battery power for achieving the maximum output torque based upon the motor torque constraints, i.e., the maximum motor torque output exceeds the maximum battery discharging power. A description of identifying an achievable maximum torque output to the second case is described herein below with reference to FIGS. 7-14.

FIG. 6 depicts a third case wherein the combination of the transformed minimum motor torque $T_A$ ('Tx_Min') and the transformed maximum motor torque $T_B$ ('Ty_Max') is less than the transformed minimum battery power ('R_Min'). Thus, the battery power constraints are more than sufficient to meet a required battery power for achieving the maximum output torque based upon the motor torque constraints, i.e., the minimum motor torque output comprising electric charging power exceeds the maximum battery charging power. A description of identifying an achievable maximum torque output to the third case is described herein below with reference to FIGS. 15-19.

In each of the first, second, and third cases, the maximum output torque $T_{M1}$ is determined to be at point Z, and comprises one or more intersections between the transformed minimum motor torque $T_A$ ('Tx_Min'), minimum motor torque $T_B$ ('Ty_Min'), the transformed maximum motor torque $T_A$ ('Tx_Max'), the transformed maximum motor torque $T_B$ ('Ty_Max'), the transformed minimum battery power ('R_Min'), the transformed maximum battery power ('R_Max'), and the constant line ('Tm 1'). The intersection(s) can be calculated by simultaneously solving Eqs.

12, 13, and 24. This solution yields a point Z representing the transformed motor torques (Tx, Ty) which represent the achievable maximum output torque based upon the motor torque constraints and the battery power constraints. The transformed motor torques (Tx, Ty) can be retransformed to motor torques ($T_A$, $T_B$) for control and operation of the first and second electric machines 56 and 72.

The first case is shown in FIG. 4, and comprises a single zone wherein the achievable maximum torque output consists of an intersection between the transformed minimum motor torque $T_A$ ('Tx_Min') and the maximum motor torque $T_B$ ('Ty_Max'). The achievable maximum output torque is therefore the maximum output torque. The transformed motor torques (Tx_Min, Ty_Max) can be retransformed to motor torques ($T_A$, $T_B$) for controlling and operating the first and second electric machines 56 and 72.

Figure 7:
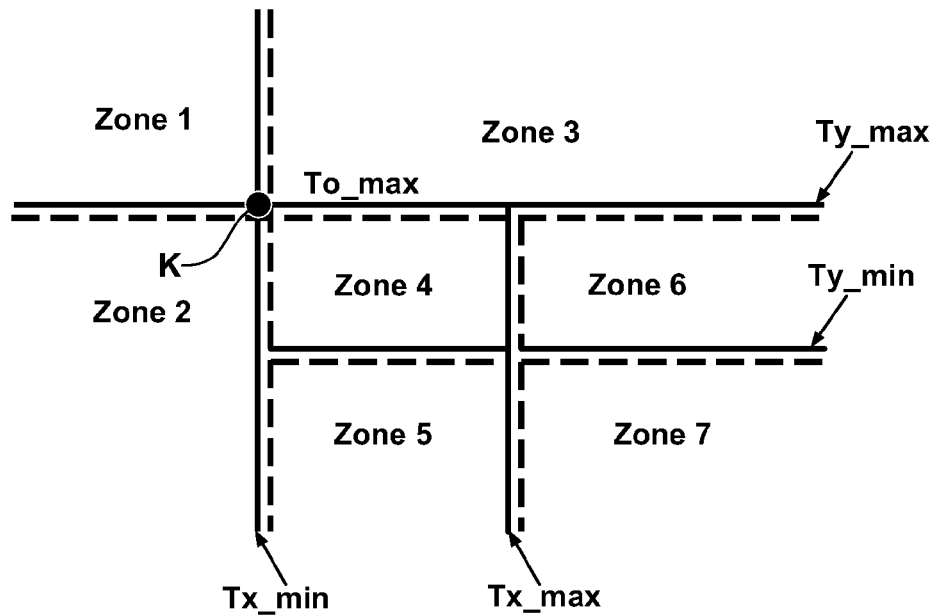

FIGS. 7-14 describe identifying an achievable maximum torque output to the second case when there are specific restrictions. FIG. 7 shows a plurality of zones for the second case ('Zone 1', 'Zone 2', 'Zone 3', 'Zone 4', 'Zone 5', 'Zone 6', 'Zone 7'). Each of the zones is defined by orientation of the motor torque constraints consisting of the transformed minimum and maximum motor torques for $T_A$ and $T_B$ ('Tx_Min', 'Tx_Max', 'Ty_Min', 'Ty_Max') relative to the center locus point K defined by the transformed battery power constraints and designated by K, i.e., (Kx, Ky)=(0,0). Within each zone an achievable maximum output torque $T_{M1}$ can be determined within the motor torque constraints. The achievable maximum output torque $T_{M1}$ includes one of the transformed minimum motor torque $T_A$ ('Tx_Min'), the transformed maximum motor torque $T_A$ ('Tx_Max'), the transformed minimum motor torque $T_B$ ('Ty_Min'), the transformed maximum motor torque $T_B$ ('Ty_Max'), and a tangent point whereat the constant line ('Tm 1') intersects the battery power constraint comprising the maximum battery power ('R_max'). The solution set consists of a (Tx, Ty) point representing a preferred solution for controlling operation that can be retransformed to motor torques ($T_A$, $T_B$) to control operation of the first and second electric machines 56 and 72.

In operation, the specific case can be identified based upon the battery power constraints and the motor torque constraints. The specific zone can be identified based upon the transformed battery power constraints and transformed motor torque constraints. Each of the zones has at least one solution set consisting of an achievable maximum torque output (Tx, Ty) point. When there is more than one solution set, a preferred solution can be determined based upon a governing constraint. The solution set comprising the achievable maximum torque output (Tx, Ty) point is calculated by calculating intersection(s) of lines and circles and tangent points representing the transformed battery power constraints, transformed motor torque constraints, and the torque limit $T_{M1}$, which comprises the output torque $T_O$ in this embodiment. One or more solutions can be determined, and the preferred solution is that which yields a maximum torque limit $T_{M1}$ that is achievable within the motor torque constraints and includes one of the transformed minimum motor torque $T_A$ ('Tx_Min'), the transformed maximum motor torque $T_A$ ('Tx_Max'), the transformed minimum motor torque $T_B$ ('Ty_Min'), the transformed maximum motor torque $T_B$ ('Ty_Max'), and a tangent point whereat the constant line ('Tm 1') intersects the maximum battery power ('R_max').

Figure 8A:
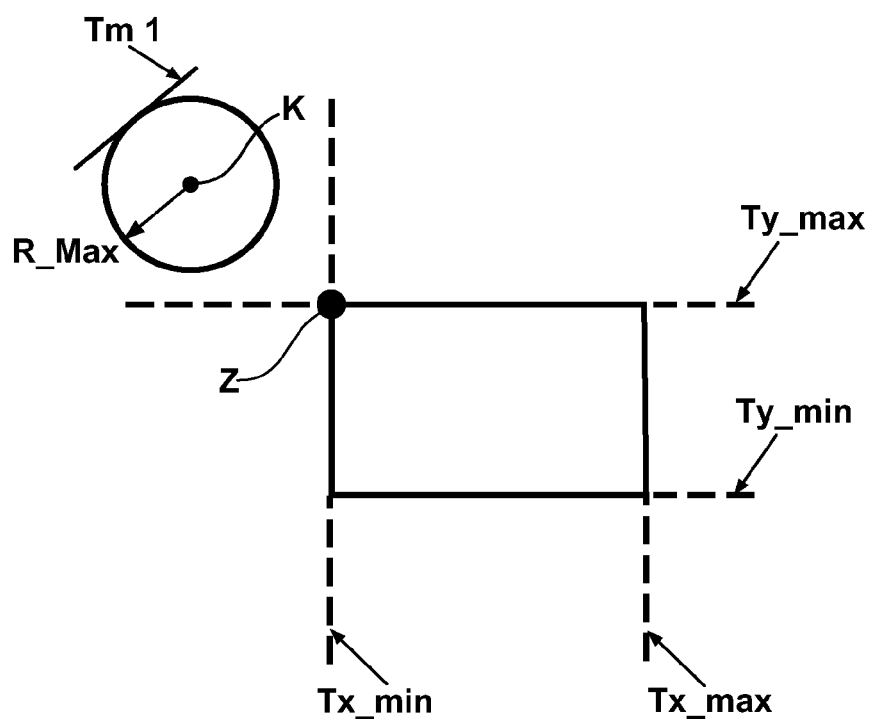
Figure 8B:
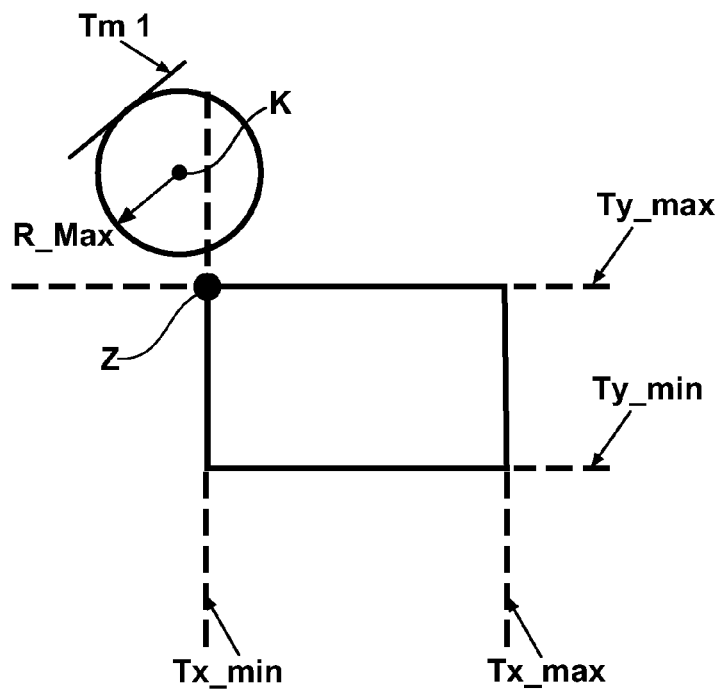

FIGS. 8A and 8B depict Zone 1, whereat the center locus point K is located such that Kx≦Tx_Min and Ky≧Ty_Max and the tangent point whereat the constant line ('Tm 1') intersects the maximum battery power ('R_max') is outside the motor torque constraints consisting of the transformed minimum and maximum motor torques for $T_A$ and $T_B$ ('Tx_Min', 'Tx_Max', 'Ty_Min', 'Ty_Max'). In Zone 1, there is no solution set that yields an achievable maximum output torque $T_{M1}$ comprising an intersection between the transformed minimum motor torque $T_A$ ('Tx_Min'), the transformed maximum motor torque $T_B$ ('Ty_Max'), and the constant line ('Tm 1'). In both FIGS. 8A and 8B there is no solution that satisfies all the motor torque and battery power constraints, and therefore, the preferred solution comprises the solution that satisfies the motor torque constraints and minimizes violations of the battery power constraints.

FIG. 8A depicts an operating condition whereat the curve representing the transformed maximum battery power ('R_max') does not intersect with any of the transformed motor torque constraints ('Tx_Min', 'Tx_Max', 'Ty_Min', 'Ty_Max'). The achievable maximum torque output is found to be the intersection of the transformed minimum motor torque $T_A$ ('Tx_Min') and the transformed maximum motor torque $T_B$ ('Ty_Max'), depicted as point Z.

FIG. 8B depicts an operating condition whereat the curve representing the transformed maximum battery power ('R_max') intersects with the transformed minimum motor torque $T_A$ ('Tx_Min'). The achievable maximum torque output is found to be the intersection of the transformed minimum motor torque $T_A$ ('Tx_Min') and the transformed maximum motor torque $T_B$ ('Ty_Max'), depicted as point Z.

FIGS. 9A, 9B, 9C, and 9D depict Zone 2, whereat the center locus point K is located such that Kx≦Tx_Min and Ky≧Ty_Max. The tangent point whereat the constant line ('Tm 1') intersects the maximum battery power ('R_max') is outside the transformed motor torque constraints ('Tx_Min', 'Tx_Max', 'Ty_Min', 'Ty_Max'). In Zone 2, the achievable maximum torque output is the (Tx, Ty) point that yields a maximum output torque $T_{M1}$ within the motor torque constraints and includes the transformed minimum motor torque $T_A$ ('Tx_Min').

Figure 9A:
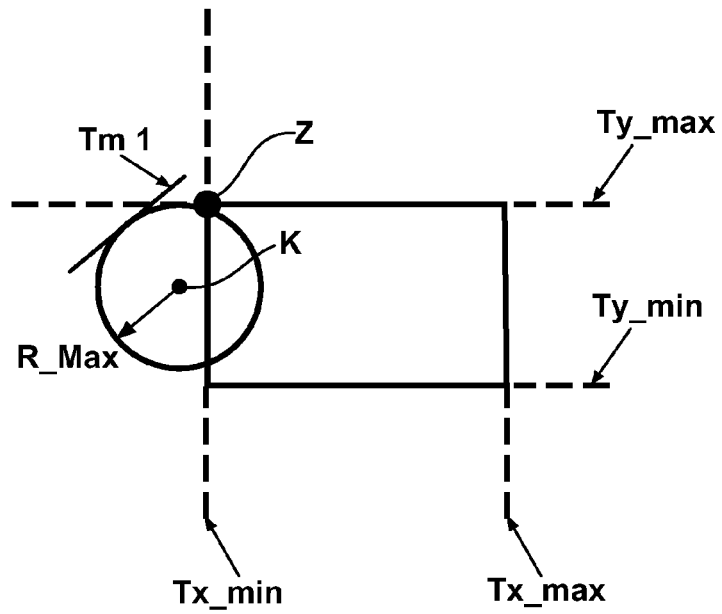

FIG. 9A depicts an operating condition whereat the curve representing the transformed maximum battery power ('R_max') intersects with the transformed minimum motor torque $T_A$ at two separate points, and the solution is the point having the greater Ty, labeled as point Z.

Figure 9B:
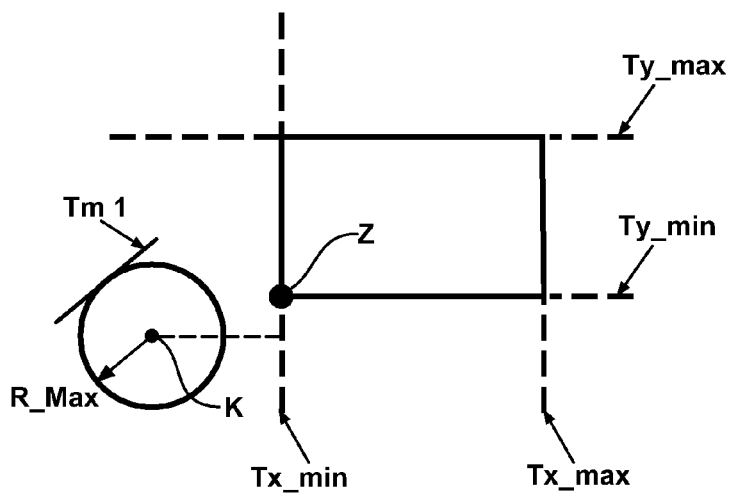

FIG. 9B depicts an operating condition whereat there is no intersection between the maximum battery power and the motor torque constraints. Furthermore, Ky of the center point K is less than the transformed minimum motor torque $T_B$ ('Ty_Min'). Thus, the achievable maximum torque output is the (Tx, Ty) point consisting of the transformed minimum motor torque $T_A$ and the transformed minimum motor torque $T_B$, labeled as point Z.

Figure 9C:
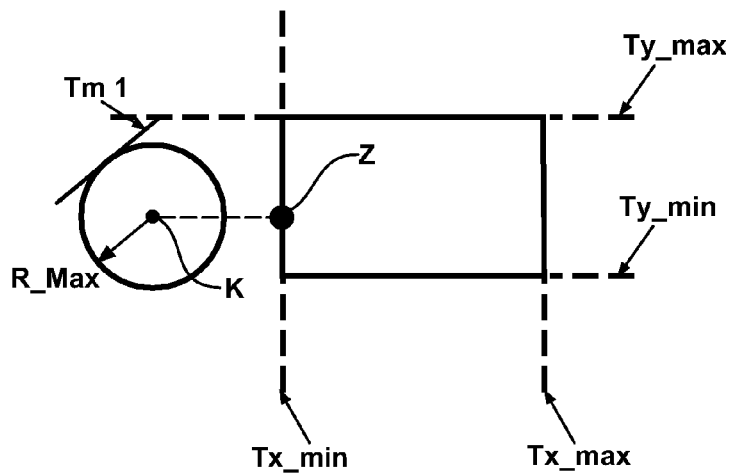

FIG. 9C depicts an operating condition whereat there is no intersection between the maximum battery power and the motor torque constraints. In this problem set, Ky of the center point K is greater than the transformed minimum motor torque $T_B$ ('Ty_Min'). Thus, the achievable maximum torque output is the (Tx, Ty) point at the intersection of the transformed minimum motor torque $T_A$ and the transformed motor torque $T_B$ corresponding to Ty=0, labeled as point Z.

Figure 9D:
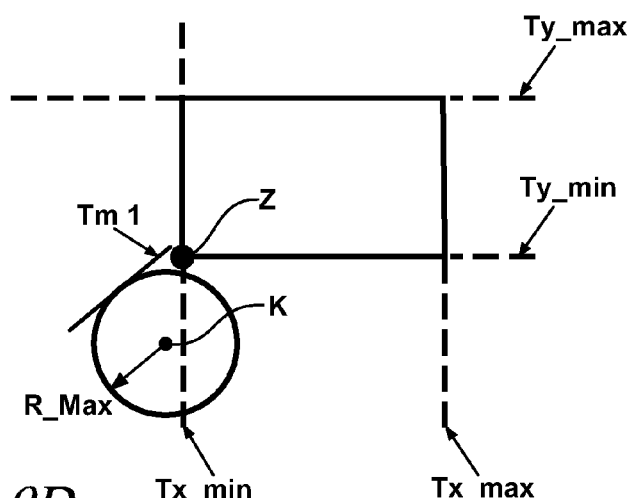

FIG. 9D depicts an operating condition whereat there are two intersections of the maximum battery power and the motor torque constraints for the transformed motor torque $T_A$ ('Tx_Min'). Since Ty of both intersection points are outside the motor torque constraints for the transformed motor torque $T_B$, the achievable maximum torque output is the (Tx, Ty) point at the intersection of the transformed minimum motor torque $T_A$ and the transformed minimum motor torque $T_B$, labeled as point Z.

FIGS. 10A, 10B, 10C, 10D, and 10E depict Zone 3, whereat the center locus point K is located such that Kx≧Tx Min and Ky≧Ty_Max. The tangent point whereat the constant line ('Tm 1') intersects the maximum battery power ('R_max') is outside the transformed motor torque constraints ('Tx_Min', 'Tx_Max', 'Ty_Min', 'Ty_Max'). In Zone 3, the preferred solution set is that which yields a maximum output torque $T_{M1}$ within the motor torque constraints and includes the transformed maximum motor torque $T_B$ ('Ty_Max').

Figure 10A:
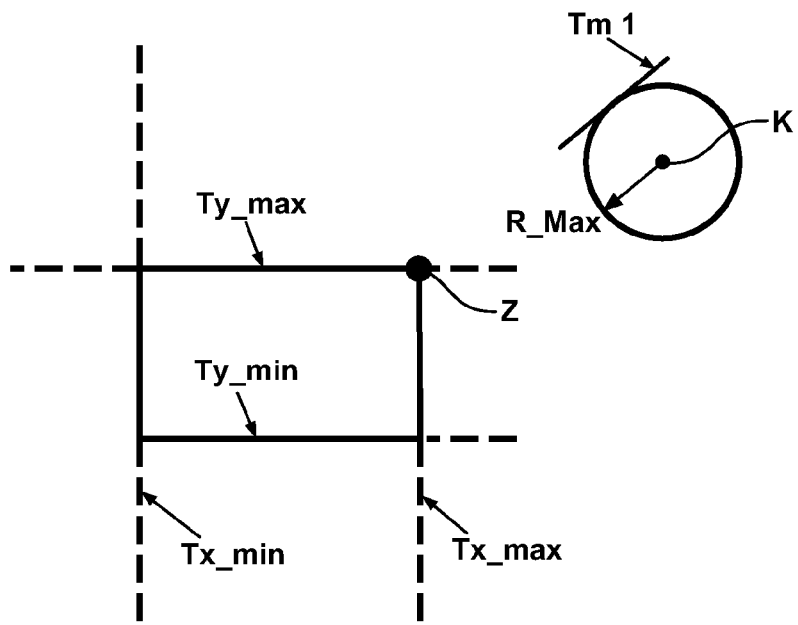

FIG. 10A depicts an operating condition whereat there is no intersection between the transformed maximum battery power and the transformed maximum motor torque $T_B$ ('Ty_Max') and Kx of the center point K is greater than the transformed maximum motor torque $T_A$ ('Tx_Max'). The achievable maximum torque output comprises the (Tx, Ty) point at the intersection of the transformed maximum motor torque $T_A$ and the transformed maximum motor torque $T_B$, depicted as point Z.

Figure 10B:
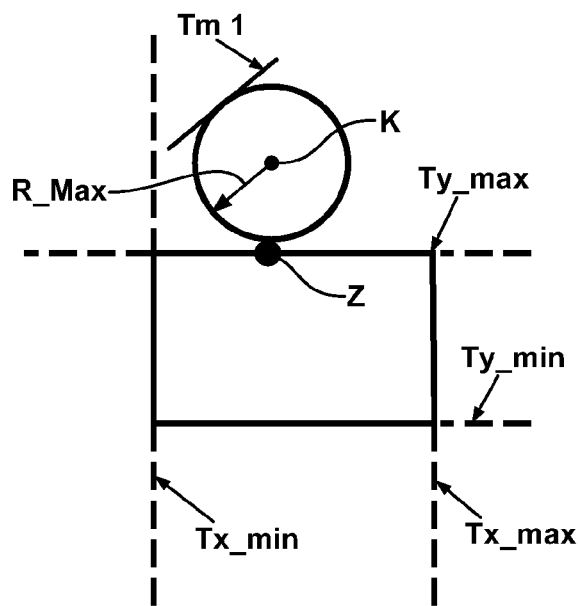

FIG. 10B depicts an operating condition whereat there are two intersections between the transformed maximum battery power and the transformed maximum motor torque $T_B$ ('Ty_Max'), and Kx of the center point K is greater than the transformed maximum motor torque $T_A$ ('Tx_Max'). The achievable maximum torque output comprises the (Tx, Ty) point at the intersection of the transformed maximum motor torque $T_A$ and the transformed maximum motor torque $T_B$, depicted as point Z.

Figure 10C:
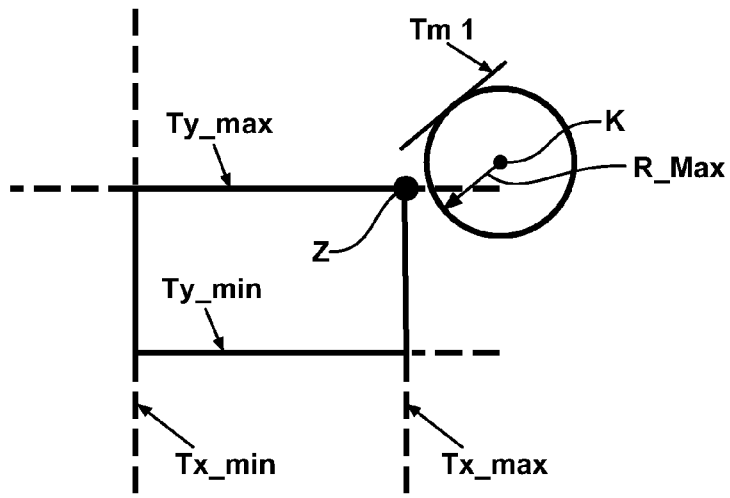

FIG. 10C depicts an operating condition whereat there is no intersection between the transformed maximum battery power and the transformed maximum motor torque $T_B$ ('Ty_Max') and Kx of the center point K is within the range of the transformed motor torque $T_A$ ('Tx_Min/Tx_Max') The achievable maximum torque output comprises the (Tx, Ty) point at the transformed maximum motor torque $T_B$ and the transformed motor torque $T_A$ corresponding to Tx=0, as depicted as point Z.

Figure 10D:
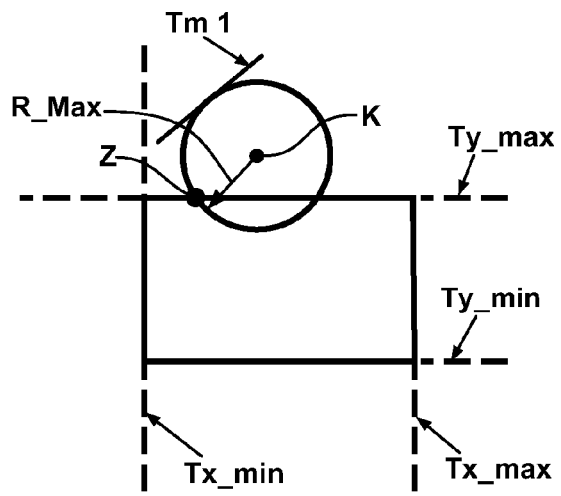

FIG. 10D depicts an operating condition whereat the transformed maximum battery power ('R_max') intersects with the transformed maximum motor torque $T_B$ ('Ty_Max') at two separate transformed motor torque $T_A$ points. The achievable maximum torque output occurs at the intersecting point having the smaller transformed motor torque $T_A$, again labeled as point Z.

Figure 10E:
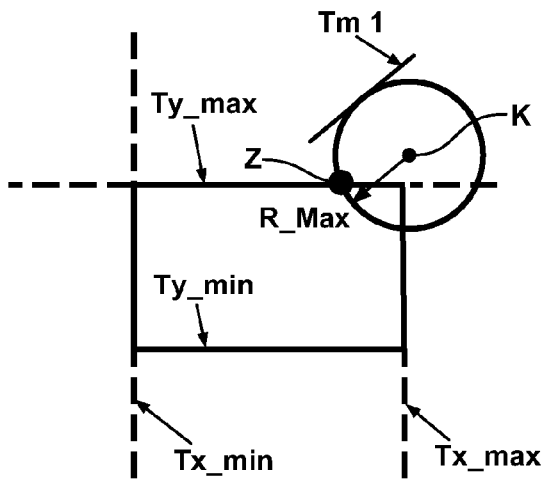

FIG. 10E depicts an operating condition whereat the transformed maximum battery power ('R_max') intersects with the transformed motor torque constraints at the transformed maximum motor torque $T_B$ ('Ty_Max') and at the transformed maximum motor torque $T_A$ ('Tx_Max'). The achievable maximum torque output is the (Tx, Ty) point at which the transformed maximum motor torque $T_B$ intersects with the transformed battery power R_max, again labeled as point Z.

Figure 11A:
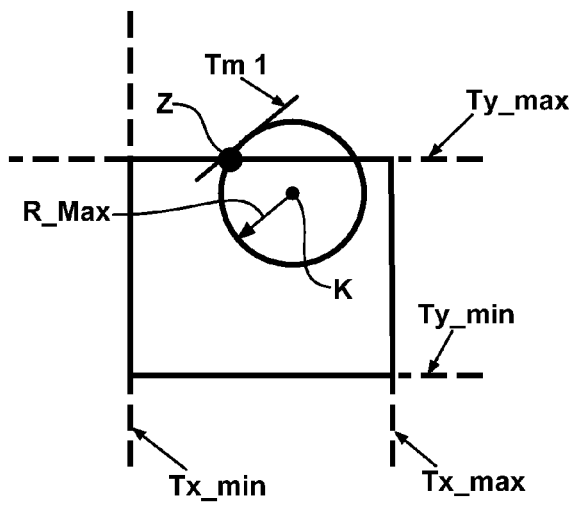
Figure 11B:
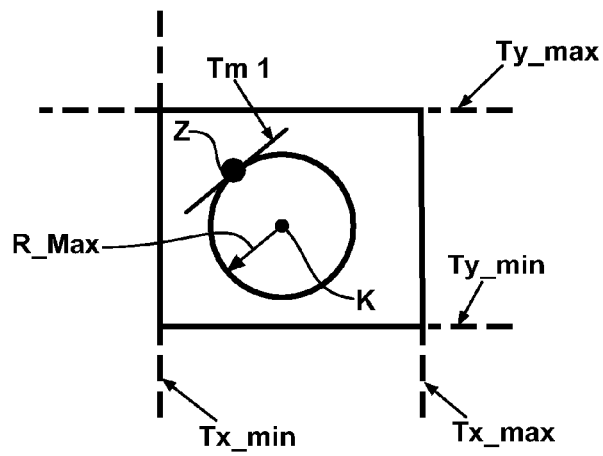
Figure 11C:
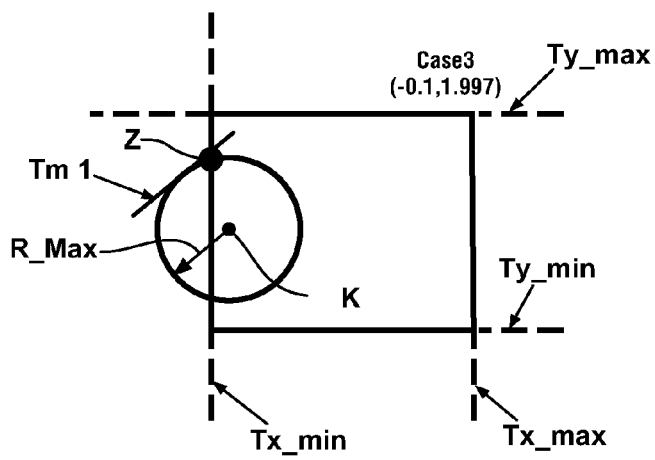

FIGS. 11A, 1B, and 11C depict Zone 4, whereat the center locus point K is located such that Tx_Min≦Kx≦Tx_Max and Ty_Min≦Ky≦Ty_Max. In Zone 4, the preferred solution set is that which yields a maximum output torque $T_{M1}$ within the motor torque constraints and includes one of the transformed maximum motor torque $T_B$ ('Ty_Max'), the transformed minimum motor torque $T_A$ ('Tx_Min'), and a tangent point whereat the constant line ('Tm 1') intersects the maximum battery power ('R_max').

FIG. 11A depicts an operating condition whereat the curve representing the transformed maximum battery power ('R_max') intersects with the transformed maximum motor torque $T_B$ ('Ty_Max') at two separate points of the transformed motor torque $T_A$. The tangent point whereat the constant line ('Tm 1') intersects the maximum battery power ('R_max') is outside the transformed motor torque constraints ('Tx_Min', 'Tx_Max', 'Ty_Min', 'Ty_Max'). The achievable maximum torque output occurred at the (Tx, Ty) point having the smaller transformed motor torque $T_A$, labeled as point Z.

FIG. 11B depicts an operating condition whereat the transformed maximum battery power ('R_max') does not intersect with either the transformed maximum or minimum motor torque $T_B$ ('Ty_Max'), ('Ty_Min') or the transformed maximum or minimum motor torque $T_A$ ('Tx_Max') ('Tx_Min'). The tangent point whereat the constant line ('Tm 1') intersects the maximum battery power ('R_max') is within the motor torque constraints. The achievable maximum torque output is the (Tx, Ty) point representing the tangent point whereat the constant line ('Tm 1') intersects the maximum battery power ('R_max'), labeled as point Z.

FIG. 11C depicts an operating condition whereat the transformed maximum battery power ('R_max') intersects with the transformed minimum motor torque $T_A$ ('Tx_Min') at two separate points. The tangent point whereat the constant line ('Tm 1') intersects the maximum battery power ('R_max') is outside the transformed motor torque constraints ('Tx_Min', 'Tx_Max', 'Ty_Min', 'Ty_Max'). The achievable maximum torque output occurs at the intersecting point having the greater transformed motor torque $T_B$, again labeled as point Z.

FIGS. 12A, 12B, 12C, and 12D depict Zone 5, whereat the center locus point K is located such that Tx_Min≦Kx≦Tx_Max and Ky≦Ty_Min. In Zone 5, the preferred solution set is that which yields a maximum output torque $T_{M1}$ within the motor torque constraints and includes one of the transformed minimum motor torque $T_B$ ('Ty_Min'), the transformed maximum motor torque $T_B$ ('Ty_Max'), the transformed minimum motor torque $T_A$ ('Tx_Min'), and a tangent point whereat the constant line ('Tm 1') intersects the maximum battery power ('R_max').

Figure 12A:
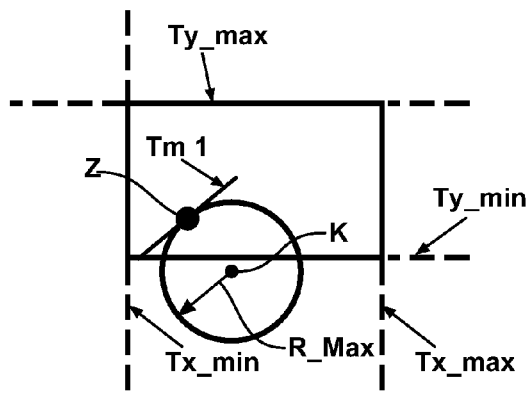

FIG. 12A depicts an operating condition whereat the constant line ('Tm 1') tangentially intersects the transformed maximum battery power ('R_max') within the transformed motor torque constraints (Tx_Min, Tx_Max, Ty_Min and Ty_Max). The achievable maximum torque output is the (Tx, Ty) point comprising the tangent point whereat the constant line ('Tm 1') intersects the maximum battery power ('R_max'), labeled as point Z.

Figure 12B:
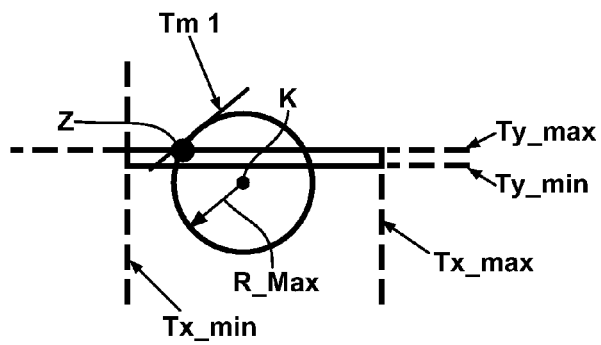

FIG. 12B depicts an operating condition whereat the transformed maximum battery power ('R_max') intersects with the transformed maximum motor torque $T_B$ ('Ty_Max') at two separate points. The achievable maximum torque output occurs at the intersecting point having smaller transformed motor torques $T_A$, labeled as point Z.

Figure 12C:
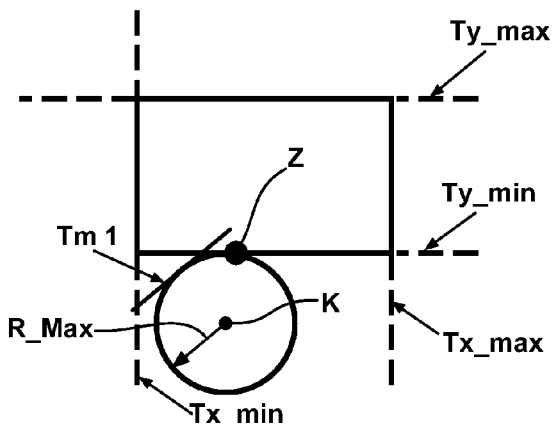

FIG. 12C depicts an operating condition whereat the transformed maximum battery power ('R_max') intersects with the transformed minimum motor torque $T_B$ ('Ty_Min') at two separate points. The achievable maximum torque output occurs at the intersecting point having smaller transformed motor torques $T_A$, labeled as point Z.

Figure 12D:
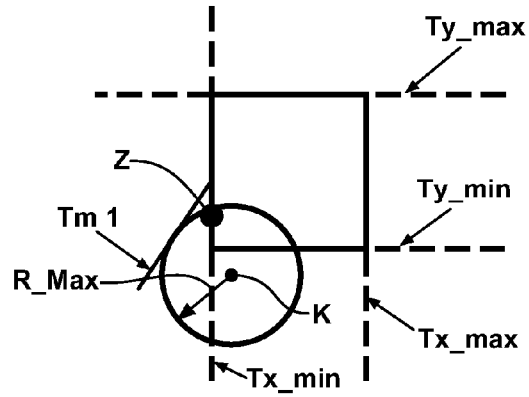

FIG. 12D depicts an operating condition whereat the transformed maximum battery power ('R_max') intersects with the transformed maximum motor torque $T_B$ ('Ty_Min') and the transformed minimum motor torque $T_A$ ('Tx_Min'). The tangent point whereat the constant line ('Tm 1') intersects the maximum battery power ('R_max') is outside motor torque constraints ('Tx_Min', 'Tx_Max', 'Ty_Min', 'Ty_Max'). The achievable maximum torque output occurs at the intersection of the transformed maximum battery power ('R_max') and the transformed minimum motor torque $T_A$ ('Tx_Min'), again labeled as point Z.

FIGS. 13A, 13B, 13C and 13D depict Zone 6 whereat the center locus point K is located such that Tx_Max≦Kx and Ty_Min≦Ky≦Ty_Max. In Zone 6, the preferred solution set is that which yields a maximum output torque $T_{M1}$ within the motor torque constraints and includes one of the transformed minimum motor torque $T_A$ ('Tx_Min'), the transformed maximum motor torque $T_A$ ('Tx_Max'), the transformed maximum motor torque $T_B$ ('Ty_Max'), and a tangent point whereat the constant line ('Tm 1') intersects the maximum battery power ('R_max').

Figure 13A:
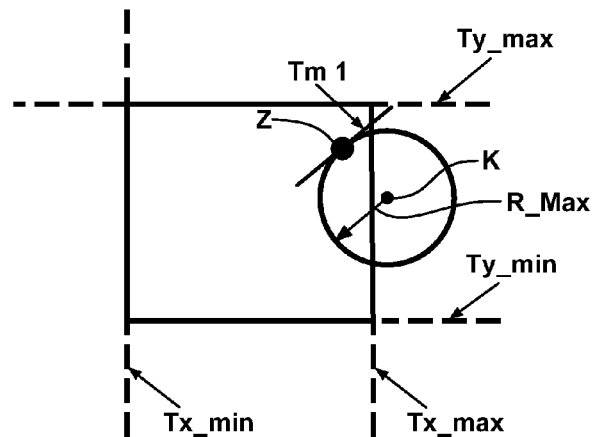

FIG. 13A depicts an operating condition whereat the constant line ('Tm 1') tangentially intersects the transformed maximum battery power ('R_max') within the motor torque constraints consisting of the transformed minimum and maximum motor torques for $T_A$ and $T_B$ ('Tx_Min', 'Tx_Max', 'Ty_Min', 'Ty_Max'). The achievable maximum torque output is the (Tx, Ty) point representing the tangent point whereat the constant line ('Tm 1') intersects the maximum battery power ('R_max'), labeled as point Z.

Figure 13B:
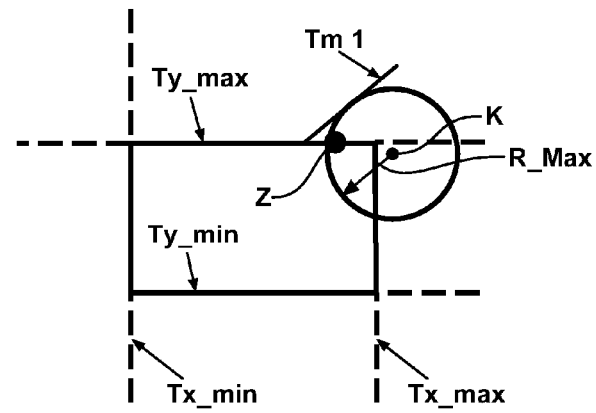

FIG. 13B depicts an operating condition whereat the transformed maximum battery power ('R_max') intersects with the transformed maximum motor torque $T_B$ ('Ty_Max') and the transformed maximum motor torque $T_A$ ('Tx_Max'). The tangent point whereat the constant line ('Tm 1') intersects the maximum battery power ('R_max') is outside the motor torque constraints consisting of the transformed minimum and maximum motor torques for $T_A$ and $T_B$ ('Tx_Min', 'Tx_Max', 'Ty_Min', 'Ty_Max'). The achievable maximum torque output is the (Tx, Ty) point representing the transformed motor torque $T_A$ at the intersection of the transformed maximum battery power ('R_max') and the transformed maximum motor torque $T_B$ ('Ty_Max'), again labeled as point Z.

Figure 13C:
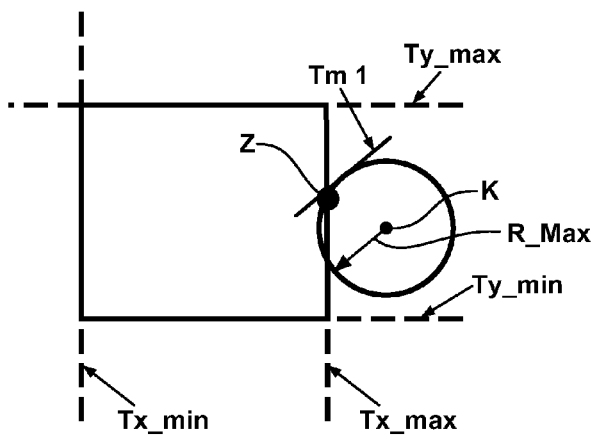

FIG. 13C depicts an operating condition whereat the transformed maximum battery power ('R_max') intersects with the transformed motor torque $T_B$ at two points along the transformed maximum motor torque $T_A$ ('Tx_Max'). The tangent point whereat the constant line ('Tm 1') intersects the maximum battery power ('R_max') is outside the motor torque constraints consisting of the transformed minimum and maximum motor torques for $T_A$ and $T_B$ ('Tx_Min', 'Tx_Max', 'Ty_Min', 'Ty_Max'). The achievable maximum torque output occurs at the intersecting point having larger transformed motor torques $T_B$, again labeled as point Z.

Figure 13D:
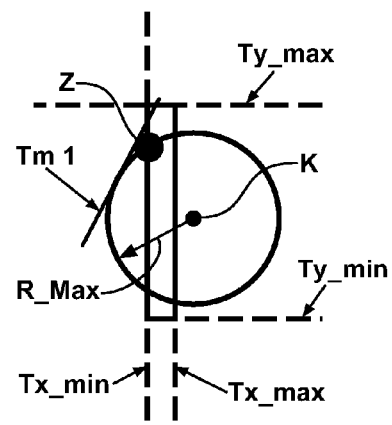

FIG. 13D depicts an operating condition whereat the transformed maximum battery power ('R_max') intersects with the transformed motor torque $T_B$ at two points along the transformed maximum motor torque $T_A$ ('Tx_Max'), at two points along the transformed minimum motor torque $T_A$ ('Tx_Min'). The tangent point whereat the constant line ('Tm 1') intersects the maximum battery power ('R_max') is outside the range of the motor torque constraints consisting of the transformed minimum and maximum motor torques for $T_A$ and $T_B$ ('Tx_Min', 'Tx_Max', 'Ty_Min', 'Ty_Max'). The achievable maximum torque output occurs at the intersecting point having larger transformed motor torques, again labeled as point Z.

FIGS. 14A, 14B, 14C, 14D, 14E and 14F depict Zone 7, whereat the center locus point K is located such that Tx_Max≦Kx and Ky≦Ty_Min. In Zone 7, the preferred solution set is that which yields a maximum output torque $T_{M1}$ within the motor torque constraints and includes one of the transformed minimum motor torque $T_A$ ('Tx_Min'), the transformed maximum motor torque $T_A$ ('Tx_Max'), the transformed minimum motor torque $T_B$ ('Ty_Min'), the transformed maximum motor torque $T_B$ ('Ty_Max'), and a tangent point whereat the constant line ('Tm 1') intersects the maximum battery power ('R_max').

Figure 14A:
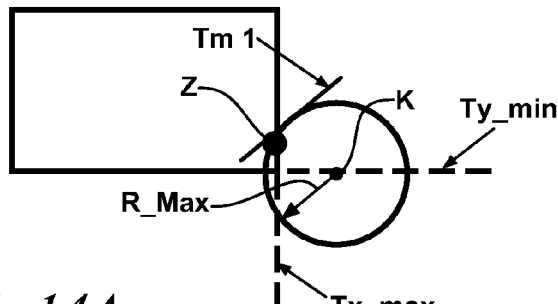

FIG. 14A depicts an operating condition whereat the transformed maximum battery power ('R_max') intersects the transformed maximum motor torque $T_A$ ('Tx_Max') and intersects the transformed minimum motor torque $T_B$ ('Ty_Min'). The tangent point whereat the constant line ('Tm 1') intersects the maximum battery power ('R_max') is outside the motor torque constraints consisting of the transformed minimum and maximum motor torques for $T_A$ and $T_B$ ('Tx_Min', 'Tx_Max', 'Ty_Min', 'Ty_Max'). The achievable maximum torque output is the (Tx, Ty) point representing the transformed motor torque $T_B$ at the intersection of the transformed maximum battery power ('R_max') and the transformed maximum motor torque $T_A$ ('Tx_Max'), labeled as point Z.

Figure 14B:
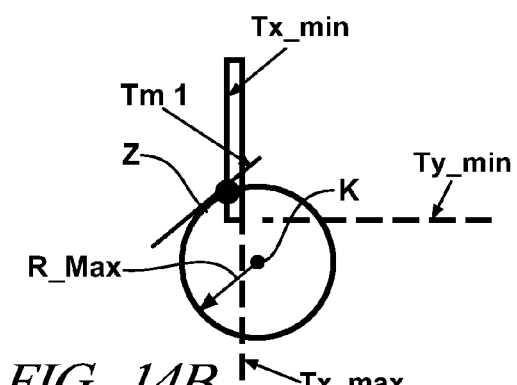

FIG. 14B depicts an operating condition whereat the transformed maximum battery power ('R_max') intersects the transformed maximum motor torque $T_A$ ('Tx_Max') and intersects the transformed minimum motor torque $T_A$ ('Tx_Min'). The tangent point whereat the constant line ('Tm 1') intersects the maximum battery power ('R_max') is outside the transformed motor torque constraints ('Tx_Min', 'Tx_Max', 'Ty_Min', 'Ty_Max'). The achievable maximum torque output is the (Tx, Ty) point representing the transformed motor torque $T_B$ at the intersection of the transformed maximum battery power ('R_max') and the transformed maximum motor torque $T_A$ ('Tx_Min'), again labeled as point Z.

Figure 14C:
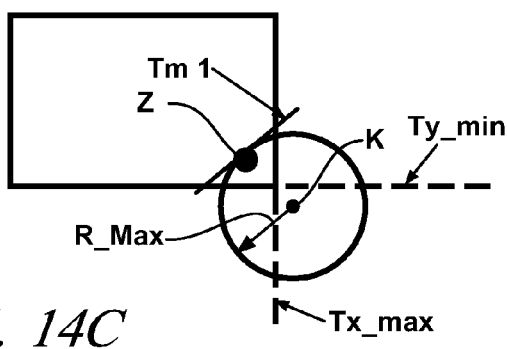

FIG. 14C depicts an operating condition whereat the transformed maximum battery power ('R_max') intersects the transformed maximum motor torque $T_A$ ('Tx_Max') and intersects the transformed minimum motor torque $T_B$ ('Ty_Min'). The tangent point whereat the constant line ('Tm 1') intersects the maximum battery power ('R_max') is within the motor torque constraints consisting of transformed minimum and maximum motor torques for $T_A$ and $T_B$ ('Tx_Min', 'Tx_Max', 'Ty_Min', 'Ty_Max'). The achievable maximum torque output is the (Tx, Ty) point representing the transformed motor torque $T_B$ and the transformed motor torque $T_A$ at the tangent point whereat the constant line ('Tm 1') intersects the maximum battery power ('R_max'), labeled as point Z.

Figure 14D:
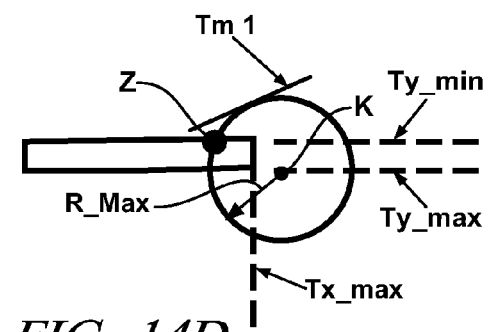

FIG. 14D depicts an operating condition whereat the transformed maximum battery power ('R_max') intersects the transformed minimum motor torque $T_B$ ('Ty_Min'), and intersects the transformed maximum motor torque $T_B$ ('Ty_Max'). The tangent point whereat the constant line ('Tm 1') intersects the maximum battery power ('R_max') is outside the motor torque constraints consisting of transformed minimum and maximum motor torques for $T_A$ and $T_B$ ('Tx_Min', 'Tx_Max', 'Ty_Min', 'Ty_Max'). The achievable maximum torque output occurs at the intersecting point of the transformed maximum battery power ('R_max') and the transformed maximum motor torque $T_B$ ('Ty_Max'), again labeled as point Z.

Figure 14E:
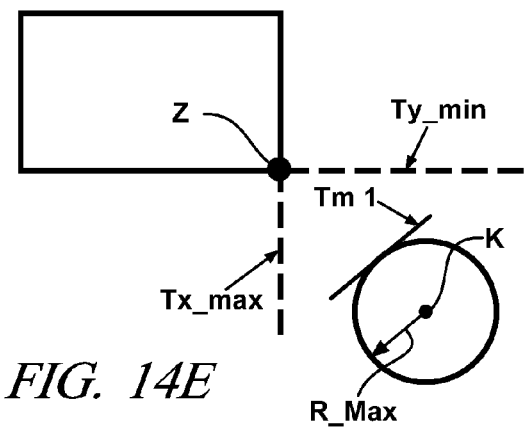

FIG. 14E depicts an operating condition whereat the transformed maximum battery power ('R_max') does not intersect the motor torque constraints consisting of the transformed minimum and maximum motor torques for $T_A$ and $T_B$ ('Tx_Min', 'Tx_Max', 'Ty_Min', 'Ty_Max'). The achievable maximum torque output is the (Tx, Ty) point representing the transformed maximum motor torque $T_A$ ('Tx_Max') and the transformed minimum motor torque $T_B$ ('Ty_Min'), labeled as point Z.

Figure 14F:
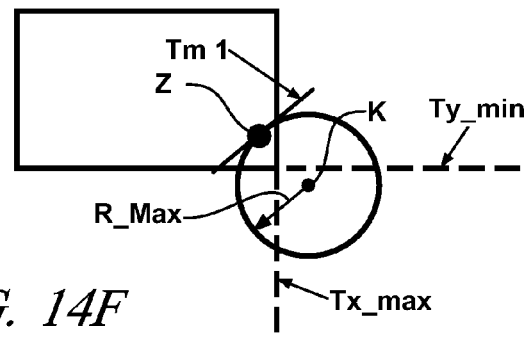

FIG. 14F depicts an operating condition whereat the transformed maximum battery power ('R_max') intersects with the transformed maximum motor torque $T_A$ ('Tx_Max') and the transformed minimum motor torque $T_B$ ('Ty_Min'). The tangent point whereat the constant line ('Tm 1') intersects the maximum battery power ('R_max') is within the motor torque constraints consisting of the transformed minimum and maximum motor torques for $T_A$ and $T_B$ ('Tx_Min', 'Tx_Max', 'Ty_Min', 'Ty_Max'). The achievable maximum torque output is the (Tx, Ty) point representing the transformed motor torque $T_B$ and the transformed motor torque $T_A$ at the tangent point whereat the constant line ('Tm 1') intersects the maximum battery power ('R_max'), labeled as point Z.

Figure 15:
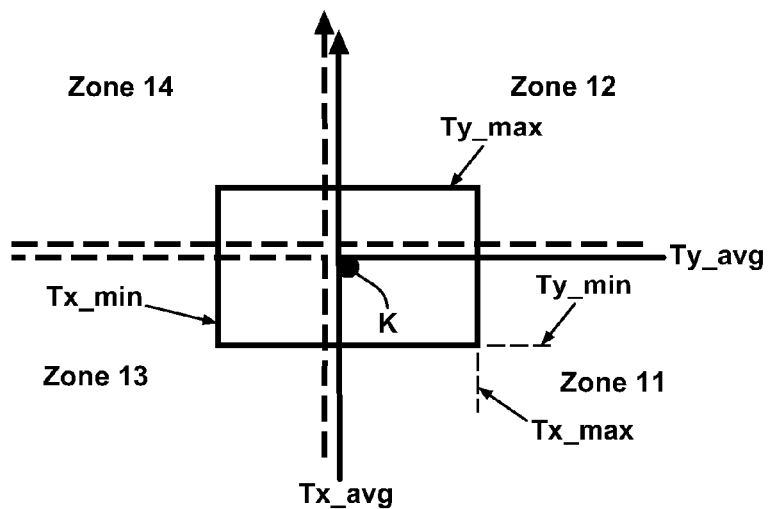

FIG. 15 shows a plurality of zones for the third case whereat the battery power at (Tx_Min. Ty_Max) point is less than the minimum battery power ('R_Min') ('Zone 11', 'Zone 12', 'Zone 13', 'Zone 14'). Each of the zones is defined by orientation of the center locus point K defined by the transformed battery power constraints relative to an average transformed motor torque $T_A$ ('Tx_avg') and an average transformed motor torque $T_B$ ('Ty_avg'). The average transformed motor torque $T_A$ ('Tx_avg') is a mathematical average of the transformed minimum motor torque $T_A$ ('Tx_Min') and the transformed maximum motor torque $T_A$ ('Tx_Max'). The average transformed motor torque $T_B$ ('Ty_avg') is a mathematical average of the transformed minimum motor torque $T_B$ ('Ty_Min') and the transformed maximum motor torque $T_B$ ('Ty_Max'). Each of the zones yields a solution for an achievable maximum output torque $T_{M1}$ within the motor torque constraints and includes one of the transformed minimum motor torque $T_A$ ('Tx_Min'), the transformed maximum motor torque $T_A$ ('Tx_Max'), the transformed minimum motor torque $T_B$ ('Ty_Min'), and the transformed maximum motor torque $T_B$ ('Ty_Max'). The achievable maximum torque output set consists of a (Tx, Ty) point representing a preferred solution for controlling operation that can be retransformed to ($T_A$, $T_B$) to control operation of the first and second electric machines 56 and 72.

In operation, the specific case can be identified based upon the battery power constraints and the battery power at the (Tx_Min. Ty_Max) point. The specific zone can be identified based upon the location of (Kx, Ky) relative to the Tx_Avg and Ty_Avg axes of the transformed motor torque constraints. Each of the zones has at least one achievable maximum torque output set consisting of a (Tx, Ty) point. When there is more than one solution set, a preferred solution can be determined based upon a governing constraint. The solution set comprising the (Tx, Ty) point can be calculated based upon the governing constraint, by calculating intersection(s) of lines and circles representing the transformed battery power constraints, transformed motor torque constraints, and the torque limit $T_{M1}$, which comprises the output torque $T_O$ in this embodiment. One or more solutions can be determined, and the preferred solution is that which yields a maximum torque limit $T_{M1}$ within the motor torque constraints and includes one of the transformed minimum motor torque $T_A$ ('Tx_Min'), the transformed maximum motor torque $T_A$ ('Tx_Max'), the transformed minimum motor torque $T_B$ ('Ty_Min'), and the transformed maximum motor torque $T_B$ ('Ty_Max').

Figure 16:
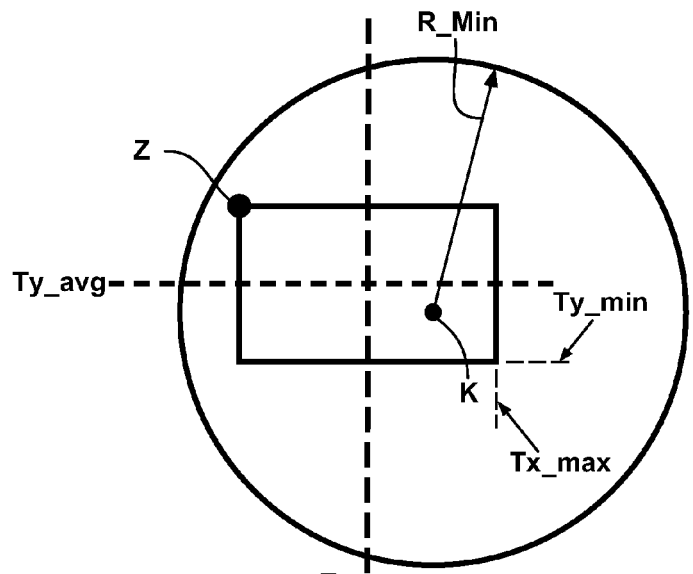

FIG. 16 depicts Zone 11, whereat the center locus point K is located such that Kx≧Tx_avg and Ky≦Ty_avg. There is no intersection between the minimum battery power ('R_min') and the motor torque constraints consisting of the transformed minimum and maximum motor torques for $T_A$ and $T_B$ ('Tx_Min', 'Tx_Max', 'Ty_Min', 'Ty_Max'). Therefore, the preferred achievable maximum torque output is the (Tx, Ty) point in closest proximity to the transformed minimum battery power ('R_Min'), which is the intersection of the transformed minimum motor torque $T_A$ ('Tx_Min') and the transformed maximum motor torque $T_B$ ('Ty_Max'), depicted as point Z.

Figure 17A:
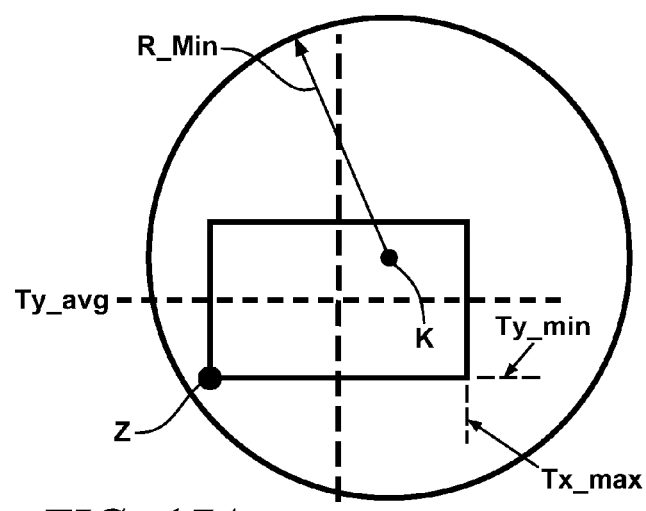
Figure 17B:
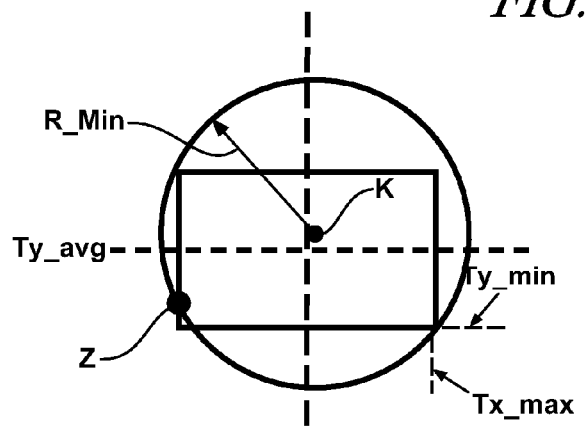

FIGS. 17A and 17B depict Zone 12, whereat the center locus point K is located such that Kx≧Tx_avg and Ky>Ty_avg. In Zone 12, the preferred solution set is that which yields a maximum output torque $T_{M1}$ within the motor torque constraints and includes the transformed minimum motor torque $T_A$ ('Tx_Min').

FIG. 17A depicts an operating condition whereat there is no intersection between the minimum battery power ('R_min') and the motor torque constraints consisting of the transformed minimum and maximum motor torques for $T_A$ and $T_B$ ('Tx_Min', 'Tx_Max', 'Ty_Min', 'Ty_Max'). The preferred achievable maximum torque output set is the (Tx, Ty) point in closest proximity to the transformed minimum battery power ('R_Min') and includes the transformed minimum motor torque $T_A$ ('Tx_Min'). Therefore, the solution is the intersection of the transformed minimum motor torque $T_A$ ('Tx_Min') and the transformed minimum motor torque $T_B$ ('Ty_Min'), depicted as point Z.

FIG. 17B depicts an operating condition whereat the minimum battery power ('R_min') intersects the transformed minimum motor torque $T_A$ ('Tx_Min'), the transformed maximum motor torque $T_A$ ('Tx_Max') and the transformed minimum motor torque $T_B$ ('Ty_Min'). The preferred achievable maximum torque output is the (Tx, Ty) point that is the intersection of the transformed minimum motor torque $T_A$ ('Tx_Min') and the transformed minimum battery power ('R_Min'), depicted as point Z.

Figure 18A:
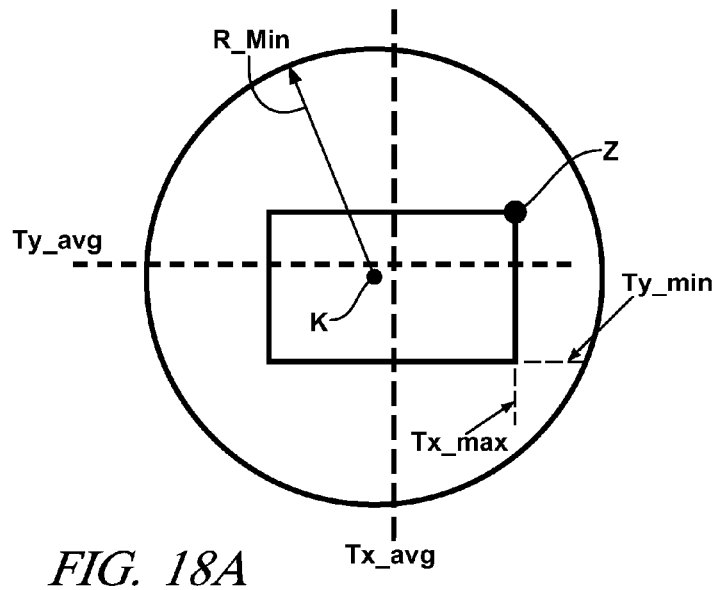
Figure 18B:
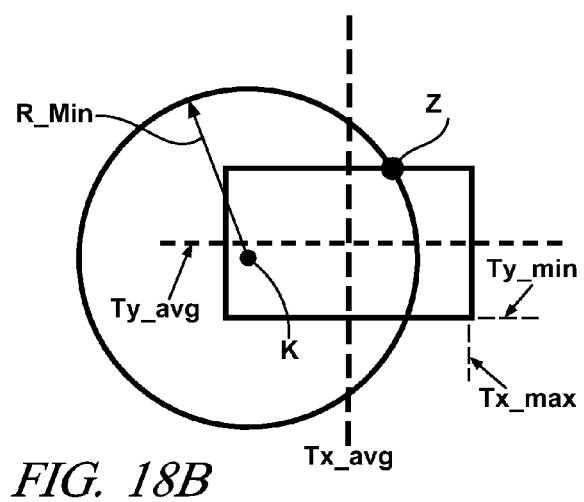

FIGS. 18A and 18B depict Zone 13, whereat the center locus point K is located such that Kx<Tx avg and Ky≦Ty_avg. In Zone 13, the preferred solution set is that which yields a maximum output torque $T_{M1}$ within the motor torque constraints and includes the transformed maximum motor torque $T_B$ ('Ty_Max').

FIG. 18A depicts an operating condition whereat there is no intersection between the minimum battery power ('R_min') and the motor torque constraints consisting of the transformed minimum and maximum motor torques for $T_A$ and $T_B$ ('Tx_Min', 'Tx_Max', 'Ty_Min', 'Ty_Max'). The preferred achievable maximum torque output set is the (Tx, Ty) point in closest proximity to the transformed minimum battery power ('R_Min') and includes the transformed maximum motor torque $T_B$ ('Ty_Max'). Thus, the achievable maximum torque output is the (Tx, Ty) point whereat the transformed maximum motor torque $T_A$ ('Tx_Max') intersects the transformed maximum motor torque $T_B$ ('Ty_Max'), depicted as point Z.

FIG. 18B depicts an operating condition whereat the minimum battery power ('R_min') intersects with the transformed maximum motor torque $T_B$ ('Ty_Max') and the transformed minimum motor torque $T_B$ ('Ty_Min'). The achievable maximum torque output set is the (Tx, Ty) point whereat the transformed minimum battery power ('R_Min') intersects the transformed maximum motor torque $T_B$ ('Ty_Max'), labeled as point Z.

FIGS. 19A, 19B, 19C, 19D, and 19E depict Zone 14, whereat the center locus point K is located such that Kx<Tx_avg and Ky>Ty_avg. In Zone 14, the preferred solution set is that which yields a maximum output torque $T_{M1}$ within the motor torque constraints and includes one of the transformed minimum motor torque $T_A$ ('Tx_Min'), the transformed maximum motor torque $T_A$ ('Tx_Max'), the transformed minimum motor torque $T_B$ ('Ty_Min'), and the transformed maximum motor torque $T_B$ ('Ty_Max'). [00110]

Figure 19A:
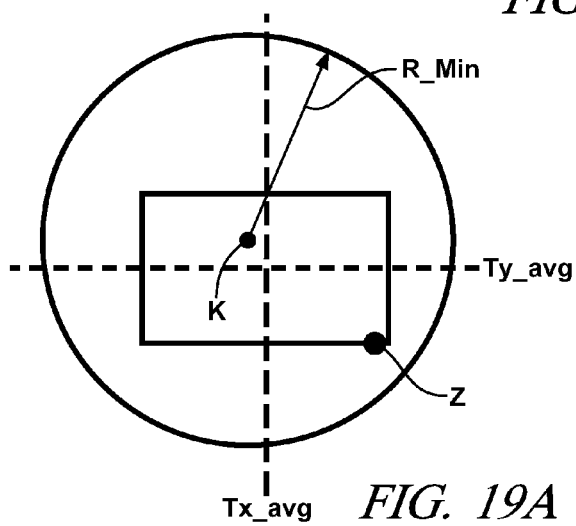

FIG. 19A depicts an operating condition whereat there is no intersection between the minimum battery power ('R_min') and the motor torque constraints consisting of the transformed minimum and maximum motor torques for $T_A$ and $T_B$ ('Tx_Min', 'Tx_Max', 'Ty_Min', 'Ty_Max'). The preferred achievable maximum torque output set is the (Tx, Ty) point in closest proximity to the transformed minimum battery power ('R_Min'). Thus, the achievable maximum torque output is the (Tx, Ty) point whereat the transformed maximum motor torque $T_A$ ('Tx_Max') intersects the transformed minimum motor torque $T_B$ ('Ty_Min'), depicted as point Z.

Figure 19B:
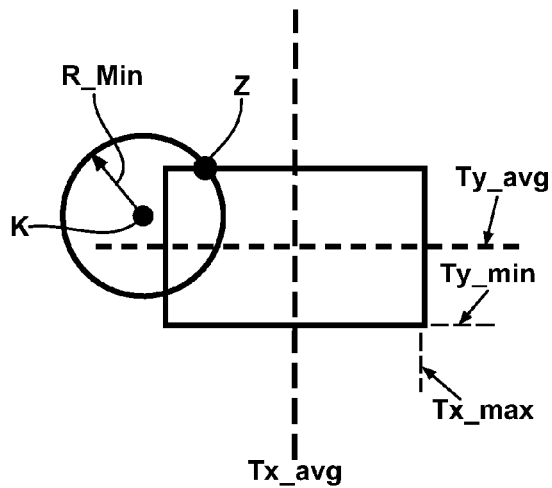

FIG. 19B depicts an operating condition whereat the minimum battery power ('R_min') intersects with the transformed maximum motor torque $T_B$ ('Ty_Max') and the transformed minimum motor torque $T_A$ ('Tx_Min'). The center locus point K is located such that Kx is less than the transformed maximum motor torque $T_B$ ('Ty_Max'). Thus, the achievable maximum torque output set is the (Tx, Ty) point whereat the transformed minimum battery power ('R_Min') intersects the transformed maximum motor torque $T_B$ ('Ty_Max'), labeled as point Z.

Figure 19C:
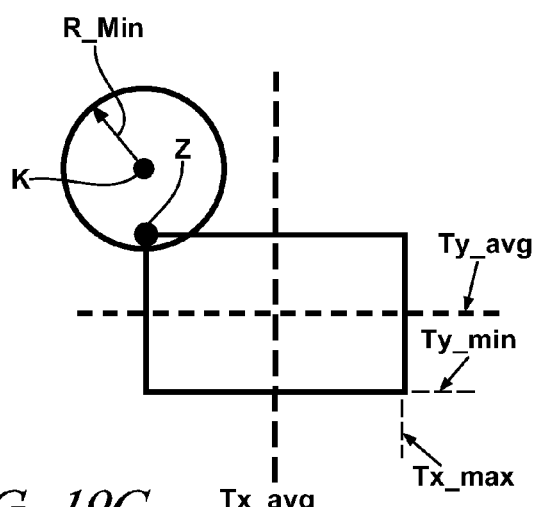

FIG. 19C depicts an operating condition whereat the minimum battery power ('R_min') intersects with the transformed maximum motor torque $T_B$ ('Ty_Max') and the transformed minimum motor torque $T_A$ ('Tx_Min'). The center locus point K is located such that Ky is greater than the transformed maximum motor torque $T_B$ ('Ty_Max'). Thus, the achievable maximum torque output set is the (Tx, Ty) point whereat the transformed minimum battery power ('R_Min') intersects the transformed minimum motor torque $T_A$ ('Tx_Min'), labeled as point Z.

Figure 19D:
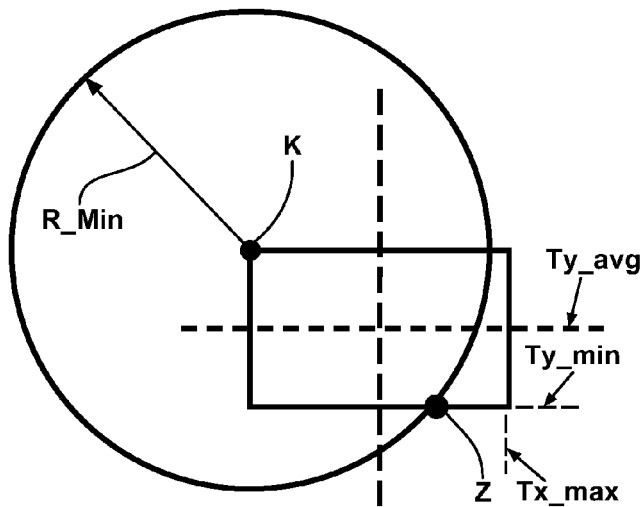

FIG. 19D depicts an operating condition whereat the minimum battery power ('R_min') intersects with the transformed maximum motor torque $T_A$ ('Tx_Max') and the transformed minimum motor torque $T_B$ ('Ty_Min'). The achievable maximum torque output set is the (Tx, Ty) point whereat the transformed minimum battery power ('R_Min') intersects the transformed minimum motor torque $T_B$ ('Ty_Min'), labeled as point Z.

Figure 19E:
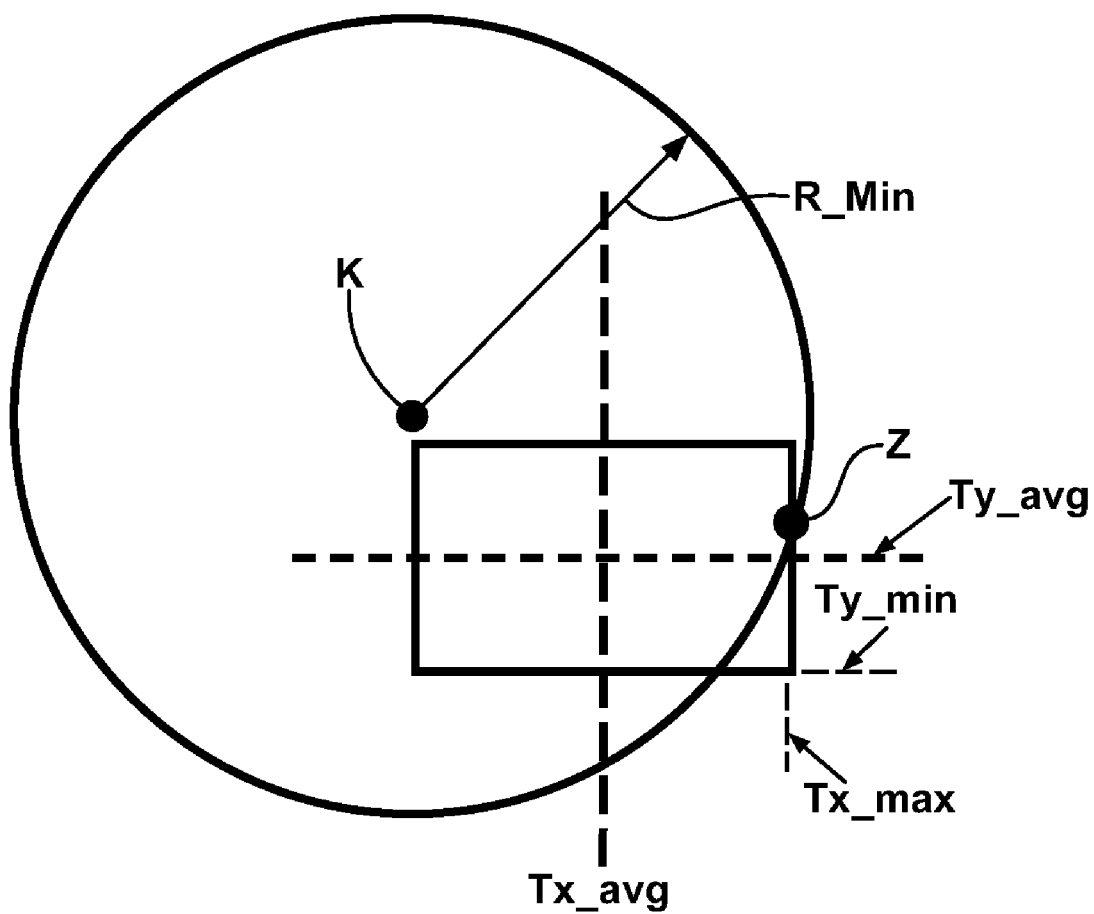

FIG. 19E depicts an operating condition whereat the minimum battery power ('R_min') intersects with the transformed maximum motor torque $T_A$ ('Tx_Max') and the transformed minimum motor torque $T_B$ ('Ty_Min'). The achievable maximum torque output set is the (Tx, Ty) point whereat the transformed minimum battery power ('R_Min') intersects the transformed maximum motor torque $T_A$ ('Tx_Max'), labeled as point Z.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling an electro-mechanical transmission coupled to first and second electric machines to transmit mechanical power to an output member, wherein a control module performs the following steps comprising:
   determining minimum and maximum motor torque constraints for the first and second electric machines;
   determining battery power constraints;
   identifying one of a first, a second and a third case based upon the minimum and maximum motor torque constraints for the first and second electric machines relative to the battery power constraints, wherein the first, second and third cases are each associated with a relationship between the minimum and maximum motor torque constraints for the first and second electric machines and the battery power constraints;
   selecting one of a plurality of zones associated with the identified one of the first, second and third case;
   determining at least one output torque for the selected zone based upon the minimum and maximum motor torque constraints and the battery power constraints;
   selecting a preferred output torque for the selected zone comprising one of the output torques for the selected zone determined based upon the minimum and maximum motor torque constraints and the battery power constraints; and
   controlling operation of the electro-mechanical transmission and the first and second electric machines to transmit the preferred output torque to the output member of the electro-mechanical transmission.

2. The method of claim 1, wherein identifying one of the first, second and third case based upon the minimum and maximum motor torque constraints for the first and second electric machines relative to the battery power constraints comprises identifying one of the first, second and third case based upon a minimum motor torque for the first electric machine and a maximum motor torque for the second electric machine relative to the battery power constraints.

3. The method of claim 2, wherein the battery power constraints comprise a maximum allowable battery charging power and maximum allowable battery discharging power.

4. The method of claim 2, wherein identifying one of the first, second and third case based upon the minimum motor torque for the first electric machine and the maximum motor torque for the second electric machine relative to the battery power constraints comprises identifying the first case when the available battery power is sufficient to meet a required battery power to achieve the minimum motor torque for the first electric machine and the maximum motor torque for the second electric machine.

5. The method of claim 4, wherein the preferred output torque comprises a maximum output torque achievable based upon the motor torque constraints.

6. The method of claim 2, wherein identifying one of the first, second and third case based upon the minimum motor torque for the first electric machine and the maximum motor torque for the second electric machine relative to the battery power constraints comprises identifying the second case when the maximum allowable battery discharging power is less than sufficient to meet a required battery power to achieve the minimum motor torque for the first electric machine and the maximum motor torque for the second electric machine.

7. The method of claim 6, comprising:
   selecting one of the plurality of zones associated with the second case; and
   determining at least one achievable maximum output torque for the selected zone based upon the motor torque constraints and the battery power constraints.

8. The method of claim 2, wherein identifying one of the first, second and third case based upon the minimum motor torque for the first electric machine and the maximum motor torque for the second electric machine relative to the battery power constraints comprises identifying the third case when the maximum allowable battery charging power exceeds a required battery power to achieve the minimum motor torque for the first electric machine and the maximum motor torque for the second electric machine.

9. The method of claim 8, comprising:
selecting one of a plurality of zones associated with the third case; and
determining at least one achievable maximum output torque for the selected zone based upon the motor torque constraints and the battery power constraints.

10. The method of claim 1, further comprising:
formulating mathematical equations representing the maximum and minimum motor torque constraints for the first and second electric machines and representing the battery power constraints;
formulating a mathematical equation representing the output torque;
transforming the mathematical equations representing the battery power constraints to equations consisting of concentric circles having corresponding radii;
transforming the mathematical equations representing the motor torque constraints for the first and second electric machines to equations consisting of lines; and,
transforming the mathematical equation representing the output torque to an equation consisting of a line.

11. The method of claim 10, further comprising:
determining a transformed achievable output torque for the selected zone of the identified one of the first, second and third cases based upon the transformed motor torque constraints for the first and second electric machines and the transformed battery power constraints; and,
retransforming the transformed achievable maximum output torque for the selected zone to determine the preferred output torque for the selected zone for transmitting to the output member of the electro-mechanical transmission.

12. The method of claim 11, wherein the preferred output torque for the selected zone for transmitting to the output member of the electro-mechanical transmission comprises a maximum transformed achievable output torque for the selected zone.

13. The method of claim 11, wherein selecting one of the plurality of zones associated with the second case comprises selecting one of the plurality of zones associated with the second case based upon a locus of a center point of the transformed battery power constraints relative to the transformed maximum and minimum motor torque constraints for the first and second electric machines.

14. The method of claim 13, wherein selecting one of the plurality of zones associated with the second case comprises selecting a first zone whereat the locus of the center point is outside the transformed maximum and minimum motor torque constraints for the first and second electric machines and the transformed achievable maximum torque output comprises the transformed minimum motor torque constraint for the first electric machine and the transformed maximum motor torque constraint for the second electric machine.

15. The method of claim 13, wherein selecting one of the plurality of zones associated with the second case comprises selecting a second zone whereat the locus of the center point is less than the transformed minimum motor torque constraint for the first electric machine and less than the transformed maximum motor torque constraint for the second electric machine and the transformed achievable maximum torque output comprises the transformed minimum motor torque constraint for the first electric machine.

16. The method of claim 13, wherein selecting one of the plurality of zones associated with the second case comprises selecting a third zone whereat the locus of the center point is greater than the transformed minimum motor torque constraint for the first electric machine and greater than the transformed maximum motor torque constraint for the second electric machine and the transformed achievable maximum torque output comprises the transformed maximum motor torque constraint for the second electric machine.

17. The method of claim 13, wherein selecting one of the plurality of zones associated with the second case comprises selecting a fourth zone whereat the locus of the center point is within the transformed motor torque constraints for the first and second electric machines and the transformed maximum torque output includes one of the transformed maximum motor torque constraint for the second electric machine, the transformed minimum motor torque constraint for the first electric machine, and a tangential intersection of the transformed output torque and the transformed maximum battery power.

18. The method of claim 13, wherein selecting one of the plurality of zones associated with the second case comprises selecting a fifth zone whereat the locus of the center point is within the transformed motor torque constraints for the first electric machine and less than the transformed maximum motor torque constraint for the second electric machine and the transformed achievable maximum torque output includes one of the transformed maximum motor torque constraint for the second electric machine, the transformed minimum motor torque constraint for the second electric machine, the transformed maximum motor torque constraint for the first electric machine, and a tangential intersection of the transformed output torque and the transformed maximum battery power.

19. The method of claim 13, wherein selecting one of the plurality of zones associated with the second case comprises selecting a sixth zone whereat the locus of the center point is greater than the transformed maximum motor torque constraint for the first electric machine and within the transformed motor torque constraints for the second electric machine and the transformed achievable maximum torque output includes one of the transformed maximum motor torque constraint for the first electric machine, the transformed minimum motor torque constraint for the first electric machine, the transformed maximum motor torque constraint for the second electric machine, and a tangential intersection of the transformed output torque and the transformed maximum battery power.

20. The method of claim 13, wherein selecting one of the plurality of zones associated with the second case comprises selecting a seventh zone whereat the locus of the center point is greater than the transformed motor torque constraint for the first electric machine and less than the transformed minimum motor torque constraint for the second electric machine and the transformed achievable maximum torque output includes one of the transformed maximum motor torque constraint for the first electric machine, the transformed minimum motor torque constraint for the first electric machine, the transformed minimum motor torque constraint for the second electric machine, the transformed maximum motor torque constraint for the second electric machine, and a tangential intersection of the transformed output torque and the transformed maximum battery power.

21. The method of claim 11, wherein selecting one of the plurality of zones associated with the third case comprises selecting one of the plurality of zones associated with the third case based upon a locus of a center point of the transformed battery power constraints relative to transformed averages of the maximum and minimum motor torque constraints for the first and second electric machines.

22. The method of claim 21, wherein selecting one of the plurality of zones associated with the third case comprises selecting a first zone whereat the locus of the center point is greater that the transformed average of the motor torque constraints for the first electric machine and less than the transformed average of the motor torque constraints for the second electric machine, and the transformed achievable maximum torque output includes the transformed minimum motor torque constraint for the first electric machine and the transformed maximum motor torque constraint for the second electric machine.

23. The method of claim 21, wherein selecting one of the plurality of zones associated with the third case comprises selecting a second zone whereat the locus of the center point is greater that the transformed average of the motor torque constraints for the first electric machine and greater than the transformed average of the motor torque constraints for the second electric machine, and the transformed achievable maximum torque output includes the transformed minimum motor torque constraint for the first electric machine.

24. The method of claim 21, wherein selecting one of the plurality of zones associated with the third case comprises selecting a third zone whereat the locus of the center point is less that the transformed average of the motor torque constraints for the first electric machine and less than the transformed average of the motor torque constraints for the second electric machine, and the transformed achievable maximum torque output includes one of the transformed maximum motor torque constraint for the second electric machine.

25. The method of claim 21, wherein selecting one of the plurality of zones associated with the third case comprises selecting a fourth zone whereat the locus of the center point is less that the transformed average of the motor torque constraints for the first electric machine and greater than the transformed average of the motor torque constraints for the second electric machine, and the transformed achievable maximum torque output includes one of the transformed maximum motor torque constraint for the first electric machine, the transformed minimum motor torque constraint for the first electric machine, the transformed minimum motor torque constraint for the second electric machine, and the transformed maximum motor torque constraint for the second electric machine.

26. The method of claim 10, wherein determining at least one output torque for the selected zone based upon the motor torque constraints and the battery power constraints comprises calculating a transformed maximum torque output comprising an intersection of the transformed mathematical equations representing the battery power constraints, the transformed mathematical equations representing the maximum and minimum motor torque constraints for the first and second electric machines and the transformed mathematical equation representing the output torque.

27. The method of claim 26, wherein the transformed maximum torque output comprises a transformed achievable maximum torque output when the transformed mathematical equations representing the battery power constraints fail to intersect with the transformed mathematical equations representing the maximum and minimum motor torque constraints for the first and second electric machines.

* * * * *